United States Patent
Araki et al.

(10) Patent No.: US 9,620,158 B2
(45) Date of Patent: Apr. 11, 2017

(54) TOLERANCE RING AND HARD DISK DEVICE

(71) Applicant: NHK Spring Co., Ltd., Yokohama-shi (JP)

(72) Inventors: Toshimitsu Araki, Kanagawa (JP); Hidenori Nanke, Kanagawa (JP)

(73) Assignee: NHK Spring Co., Ltd., Yokohama-shi (JP)

( * ) Notice: Subject to any disclaimer, the term of this patent is extended or adjusted under 35 U.S.C. 154(b) by 0 days.

(21) Appl. No.: 15/100,024

(22) PCT Filed: Nov. 28, 2014

(86) PCT No.: PCT/JP2014/081656
§ 371 (c)(1),
(2) Date: May 27, 2016

(87) PCT Pub. No.: WO2015/080276
PCT Pub. Date: Jun. 4, 2015

(65) Prior Publication Data
US 2017/0011761 A1     Jan. 12, 2017

(30) Foreign Application Priority Data
Nov. 29, 2013 (JP) .................................. 2013-248193

(51) Int. Cl.
*G11B 5/55* (2006.01)
*G11B 5/48* (2006.01)
*F16C 17/02* (2006.01)

(52) U.S. Cl.
CPC ............ *G11B 5/5569* (2013.01); *F16C 17/02* (2013.01); *G11B 5/4826* (2013.01); *G11B 5/55* (2013.01); *F16C 2370/12* (2013.01)

(58) Field of Classification Search
CPC .................................. G11B 5/55; G11B 21/08
(Continued)

(56) References Cited

U.S. PATENT DOCUMENTS

| 4,981,390 A | 1/1991 | Cramer, Jr. et al. |
| 5,315,465 A | 5/1994 | Blanks |

(Continued)

FOREIGN PATENT DOCUMENTS

| JP | 05-205413 A | 8/1993 |
| JP | 2002-130310 A | 5/2002 |

(Continued)

OTHER PUBLICATIONS

International Search Report dated Feb. 10, 2015, issued for PCT/JP2014/081656.

*Primary Examiner* — Allen T Cao
(74) *Attorney, Agent, or Firm* — Locke Lord LLP

(57) ABSTRACT

A tolerance ring includes: a base formed of a strip-like member substantially wound around into a shape; a plurality of projections provided along a winding direction of the base so as to protrude from an outer peripheral surface of the base in a radial direction of the base orthogonal to the outer peripheral surface; at least one extended portion extending from at least one of edge end portions in a width direction of the base, the width direction extending orthogonally to the winding direction and the radial direction. The extended portion extends from a region that includes at least one of a plurality of straight lines passing through respective contact points disposed between a section of the base and a circumscribed circle that circumscribes the section and extend in parallel with the width direction.

7 Claims, 18 Drawing Sheets

(58) Field of Classification Search
USPC .......................................... 360/294.6, 265.6
See application file for complete search history.

(56) References Cited

U.S. PATENT DOCUMENTS

| | | | | |
|---|---|---|---|---|
| 5,828,521 | A * | 10/1998 | Hasegawa | G11B 5/4833 360/265.6 |
| 6,288,878 | B1 | 9/2001 | Misso et al. | |
| 6,333,839 | B1 | 12/2001 | Misso et al. | |
| 7,583,476 | B2 * | 9/2009 | Hanrahan | G11B 5/4813 360/265.6 |
| 8,363,359 | B2 * | 1/2013 | Slayne | F16C 27/04 360/265.6 |
| 9,019,663 | B2 * | 4/2015 | Araki | G11B 5/4813 360/265.2 |
| 2002/0118490 | A1 * | 8/2002 | Macpherson | F16C 27/04 360/265.6 |
| 2003/0053260 | A1 * | 3/2003 | Barina | F16C 27/04 360/265.6 |
| 2008/0043375 | A1 * | 2/2008 | Hanrahan | F16C 27/00 360/265.6 |
| 2012/0087044 | A1 * | 4/2012 | Schmidt | G11B 5/4813 360/265.6 |
| 2013/0105267 | A1 | 5/2013 | Nakamura et al. | |
| 2014/0185164 | A1 * | 7/2014 | Nias | F16D 1/0829 360/246.8 |

FOREIGN PATENT DOCUMENTS

| | | |
|---|---|---|
| JP | 2003-522912 A | 7/2003 |
| JP | 2007-305268 A | 11/2007 |
| JP | 4027664 B2 | 12/2007 |
| JP | 2012-052638 A | 3/2012 |

* cited by examiner

TOLERANCE RING AND HARD DISK DEVICE

FIELD

The present invention relates to a tolerance ring for use in hard disk devices or other applications and to a hard disk device including the tolerance ring.

BACKGROUND

Hard disk devices have conventionally been used in information processing equipment such as computers. Hard disk devices are now mounted not only as external storage devices for computers but also in home appliances such as televisions and camcorders, and automotive electronics.

A conventional hard disk device 200 illustrated in FIG. 29 has a drive mechanism housed in a casing body 201. The drive mechanism has a spindle 203 that rotatably drives a hard disk 202 serving as a recording medium, a carriage 205 that supports a magnetic head 204 recording information and reading information on/from the hard disk 202 and pivots over a surface of the hard disk 202, a voice coil motor (VCM) 206 that allows the carriage 205 to precisely pivot to control scan with the magnetic head 204, a pivot shaft 207 that is fixed to the casing body 201 and rotatably joins the casing body 201 to the carriage 205, and a tolerance ring 208 (see FIG. 30) that fixes the carriage 205 and the pivot shaft 207 to each other. The pivot shaft 207 is, for example, approximately shaped like a column and has a structure of a bearing.

FIG. 30 is a perspective view illustrating the configuration of the tolerance ring in the conventional hard disk device. The conventional tolerance ring includes, as in this tolerance ring 208 illustrated in FIG. 30, a base 208a that is formed of a strip-like member substantially wound around in a predetermined direction into a ring shape. The tolerance ring 208 has a plurality of projections 208b (contact portions) on the outer peripheral surface of the base 208a. The projections 208b each protrude to be convex from a substantially rectangular strip-like region. After the tolerance ring 208 is inserted into an opening in the carriage 205, the pivot shaft 207 is press-fitted into the inside of the tolerance ring 208.

As such a tolerance ring, a tolerance ring having a plurality of convex contact portions protruding on the outer peripheral side is disclosed (see, for example, Patent Literatures 1 to 5). In the tolerance ring disclosed in Patent Literatures 1 to 5, the contact portions are in pressure-contact with the side surface of one of the carriage and the pivot shaft to fix the carriage and the pivot shaft to each other.

Preferably, the tolerance ring is capable of elastically deforming in the carriage and is held in position such that a shape thereof along the winding direction takes a substantially circular shape that is roughly equal to the shape of the opening on the carriage side.

CITATION LIST

Patent Literature 1: Japanese Laid-open Patent Publication No. 5-205413
Patent Literature 2: Publication of Japanese Translation of PCT Application No. 2003-522912
Patent Literature 3: Japanese Laid-open Patent Publication No. 2002-130310
Patent Literature 4: Japanese Laid-open Patent Publication No. 2007-305268
Patent Literature 5: Japanese Patent No. 4027664

SUMMARY

Technical Problem

FIG. 31 is a diagram illustrating insertion of the pivot shaft into the tolerance ring in the conventional hard disk device. For convenience of an actual assembly job, the tolerance ring 208 is designed to have a radius of curvature greater than the radius of curvature of an opening 205a in the carriage 205 because the tolerance ring 208 needs to be held in the carriage 205. Molding the tolerance ring 208 into a shape as close to a perfect circle as possible is an extremely difficult task to perform and the tolerance ring 208 has a shape distorted in the winding direction. As a result, the tolerance ring 208 held in the carriage 205 has an uneven shape along the winding direction. The shape is not substantially circular, but is, for example, elliptic. This uneven shape includes a portion having a diameter smaller than the diameter of the pivot shaft 207 and the pivot shaft 207 abuts on and rides over the portion. As a result, insertion of the pivot shaft 207 is difficult or disabled. Forcing to insert the pivot shaft 207 can, for example, damage the base 208a of the tolerance ring 208.

Even when the pivot shaft 207 can be inserted without causing the tolerance ring 208 to be considerably deformed, a proximal end of the tolerance ring 208 at the portion having a diameter smaller than the diameter of the pivot shaft 207 abuts on the pivot shaft 207 during the insertion. Thus, the proximal end of the tolerance ring 208 and/or a wall of the pivot shaft 207 may be damaged, resulting in contamination. To reduce the likelihood of occurrence of such contamination and to prevent the tolerance ring from being damaged, a need exists to improve insertion performance of the pivot shaft in the tolerance ring.

The present invention has been made in view of the foregoing and it is an object of the present invention to provide a tolerance ring and a hard disk device that can improve insertion performance of the pivot shaft.

Solution to Problem

To solve the above-described problem and achieve the object, a tolerance ring according to the present invention includes a base formed of a strip-like member substantially wound around into a shape and a plurality of projections provided along a winding direction of the base so as to protrude from an outer peripheral surface of the base in a radial direction of the base orthogonal to the outer peripheral surface. The tolerance ring includes: one or a plurality of extended portions that extend from at least one of edge end portions in a width direction of the base, the width direction extending orthogonally to the winding direction and the radial direction, and the extended portion extends from a region that includes at least one of a plurality of straight lines, the straight lines passing through respective contact points and extending in parallel with the width direction, the contact points being disposed between a section of the base and a circumscribed circle that circumscribes the section, the section being taken along a plane that extends in parallel with the radial direction of the base and that does not pass the projections, and representing the base that is necked down with both ends in the winding direction brought close to each other relative to the base in a natural state.

Moreover, in the tolerance ring according to the present invention, both ends in the winding direction have inclined portions that are inclined so as to include distal ends in an extended direction becoming gradually closer to each other.

Moreover, in the tolerance ring according to the present invention, the contact points include either one of an end in the winding direction of the base, a small radius-of-curvature portion having a radius of curvature relatively smaller than radiuses of curvature of other portions in the winding direction in the section, and a portion at which a cutout in the width direction is formed, or a combination thereof.

Moreover, in the tolerance ring according to the present invention, in the extended portion, at least one of two straight lines crosses the projection, the two straight lines extending in parallel with the width direction and passing through respective proximal ends of the both ends in the winding direction which join the base.

Moreover, in the tolerance ring according to the present invention, the small radius-of-curvature portion is provided in plurality, and the small radius-of-curvature portions are disposed at respective positions that divide a length of the strip-like member in a longitudinal direction into equally divided parts.

Moreover, in the tolerance ring according to the present invention, the extended portion has a tapered portion formed on an inner peripheral side on an end in the width direction, the tapered portion having an inclined surface that is inclined such that a wall thickness is thinner toward a distal end.

A hard disk device according to the present invention includes: a hard disk that serves as a recording medium; a magnetic head unit configured to record information on the hard disk and to read information from the hard disk; a carriage configured to support the magnetic head unit and to pivot over a surface of the hard disk; a tolerance ring including a base formed of a strip-like member substantially wound around into a shape and a plurality of projections provided along a winding direction of the base so as to protrude from an outer peripheral surface of the base in a radial direction of the base orthogonal to the outer peripheral surface, and housed in a hollow space formed in the carriage; and a pivot shaft disposed inside the tolerance ring. The tolerance ring includes: one or a plurality of extended portions that extend from at least one of edge end portions in a width direction of the base, the width direction extending orthogonally to the winding direction and the radial direction, and the extended portion extends from a region that includes at least one of a plurality of straight lines, the straight lines passing through respective contact points and extending in parallel with the width direction, the contact points being disposed between a section of the base and a circumscribed circle that circumscribes the section, the section being taken along a plane that extends in parallel with the radial direction of the base and that does not pass the projections, and representing the base that is necked down with both ends in the winding direction brought close to each other relative to the base in a natural state.

Advantageous Effects of Invention

The present invention achieves the effect of improving insertion performance when the pivot shaft is inserted in the tolerance ring.

DESCRIPTION OF EMBODIMENTS

Figure 1:
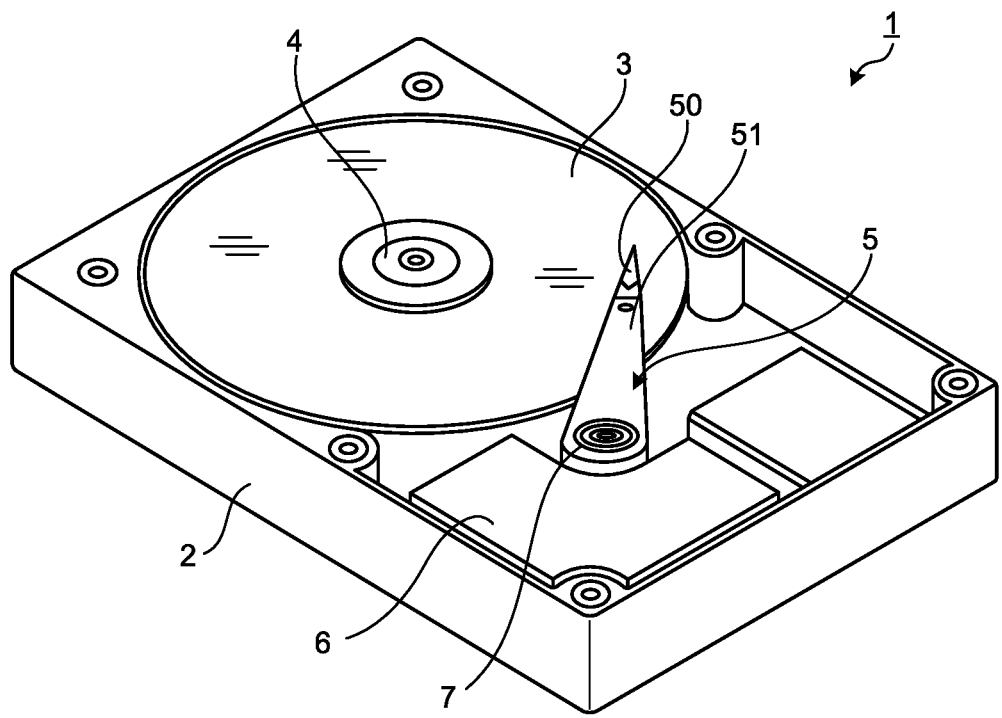
FIG. 1 is a perspective view illustrating a schematic configuration of a hard disk device according to a first embodiment of the present invention.

Embodiments for carrying out the present invention will be described in details below in conjunction with the drawings. It should be noted that the following embodiments do not limit the present invention. The drawings referred to in the following description only schematically illustrate the shape, size, and positional relation to such an extent that the contents of the present invention can be understood. That is, the present invention is not limited only to the shape, size, and positional relation illustrated in the drawings. In the following description, a hard disk device will be described as an example device that includes the tolerance ring.

First Embodiment

FIG. 1 is a perspective view illustrating the overall configuration of a hard disk device 1 according to a first embodiment of the present invention. The hard disk device 1 illustrated in FIG. 1 has a drive mechanism housed in a casing body 2. The drive mechanism includes a hard disk 3 serving as a recording medium, a spindle 4 that rotatably drives the hard disk 3, a carriage 5 that supports a magnetic head unit 50 recording information and reading information on/from the hard disk 3 and pivots over a surface of the hard disk 3, a VCM 6 that allows the carriage 5 to precisely pivot to control scan with the magnetic head unit 50, a column-shaped pivot shaft 7 that is fixed to the casing body 2 to rotatably join the casing body 2 to the carriage 5, and a tolerance ring 8 (see FIG. 2) that fixes the carriage 5 and the pivot shaft 7 to each other. The pivot shaft 7 is, for example, approximately shaped like a column and has a structure of a bearing.

Figure 2:
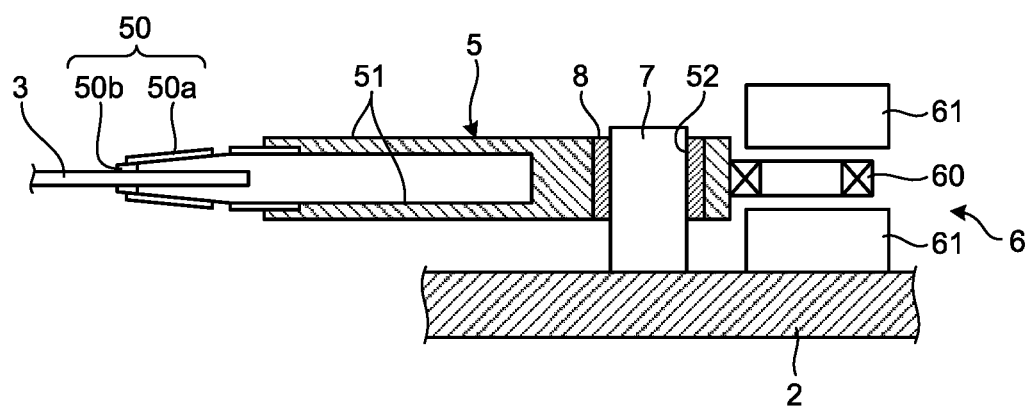
FIG. 2 is a partial sectional view illustrating a configuration of main components of the hard disk device illustrated in FIG. 1.
Figure 3:
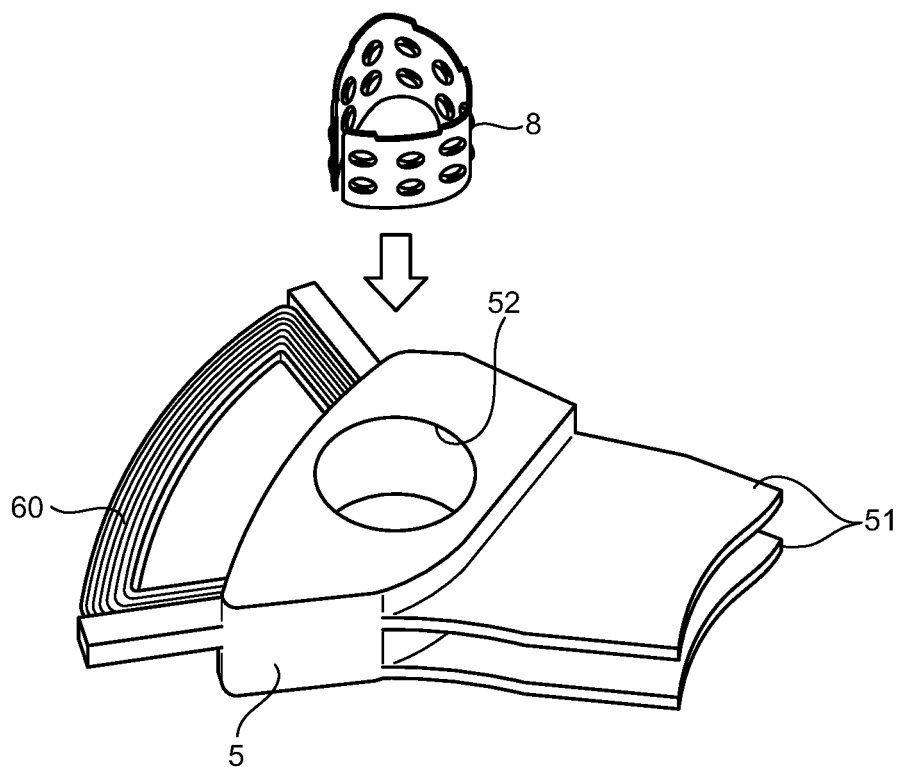
FIG. 3 is a perspective view illustrating the configuration of the main components of the hard disk device illustrated in FIG. 1.

FIG. 2 is a partial sectional view illustrating the configuration of the main part of the hard disk device 1 illustrated in FIG. 1. FIG. 3 is a perspective view illustrating the configuration of the main part of the hard disk device 1 illustrated in FIG. 1. The carriage 5 has an arm 51 that extends over the surface of the hard disk 3 and holds the magnetic head unit 50 at a front end thereof, and a joint portion 52 that is joined to the pivot shaft 7 and that is a hole with a diameter slightly larger than the diameter of the pivot shaft 7.

As illustrated in FIG. 2, the magnetic head unit 50 has a suspension 50a that is floated from the surface of the hard disk 3 by the air flow produced by rotation of the hard disk 3, and a magnetic head 50b provided at an end of the suspension 50a on the side different from the side connected to the arm 51 to record and read information.

The VCM 6 includes a coil 60 joined to the end side different from the arm 51 side and two magnets 61 having the coil 60 sandwiched therebetween. The VCM 6 rotatably drives a magnetic head unit 50 of the carriage 5 over the surface of the hard disk 3 with a force produced by the current and magnetic field flowing through the coil 60.

The tolerance ring 8 is inserted into the hollow space of the joint portion 52 of the carriage 5 and receives the pivot shaft 7 press-fitted in the inside thereof, thereby fixing the carriage 5 and the pivot shaft 7 to each other. The carriage 5 is thus pivotably fixed around the center axis in the longitudinal direction of the pivot shaft 7 that is a bearing. The fixing of the carriage 5 to the pivot shaft 7 prevents the motive power exerted to pivot the carriage 5 by the VCM 6 from being transferred to the casing body 2.

Figure 4:
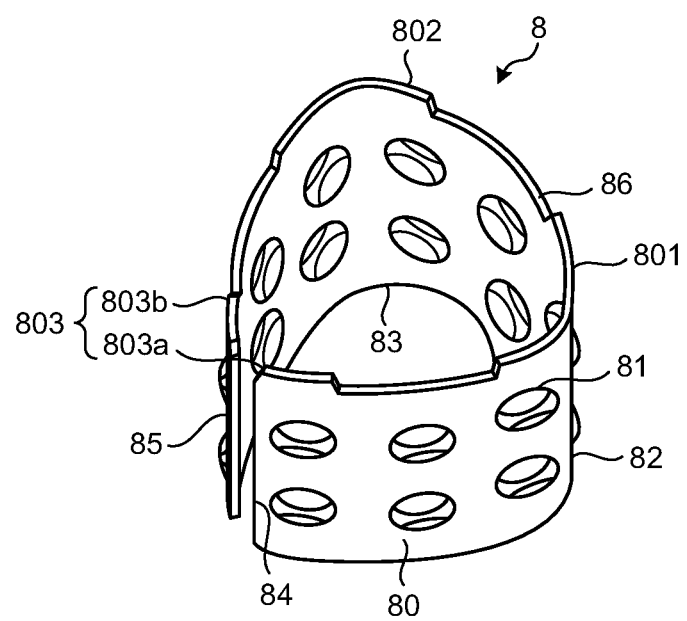
FIG. 4 is a perspective view illustrating a configuration of a tolerance ring according to the first embodiment of the present invention.
Figure 5:
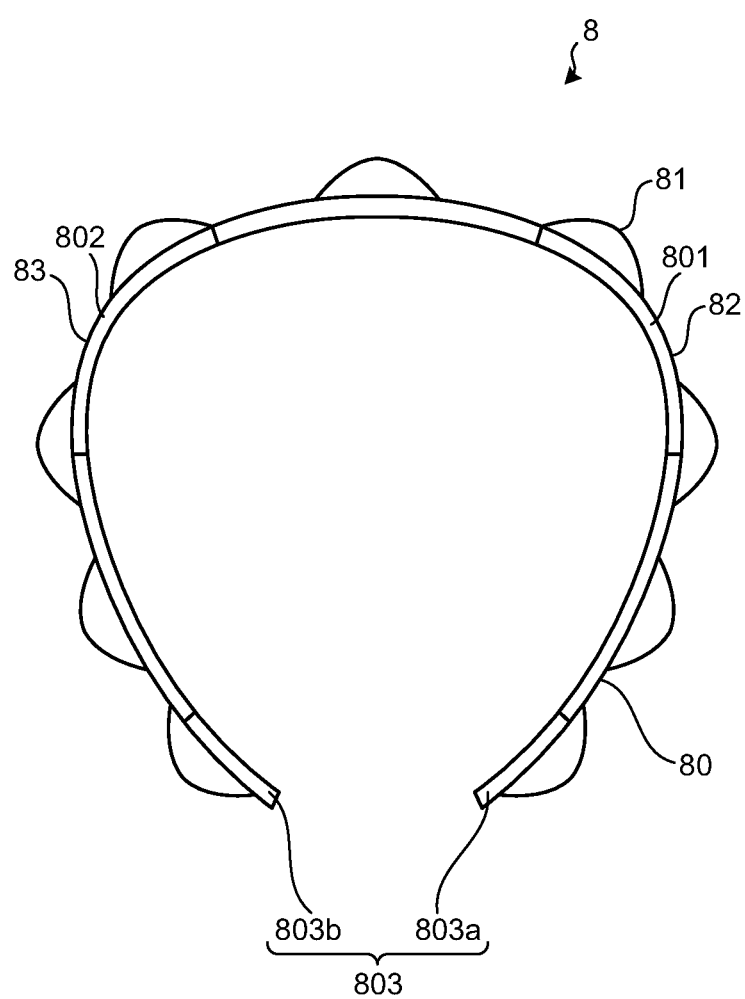
FIG. 5 is a plan view illustrating the configuration of the tolerance ring according to the first embodiment of the present invention.

FIG. 4 is a perspective view illustrating a configuration of the tolerance ring 8 according to the first embodiment. FIG. 5 is a plan view illustrating the configuration of the tolerance ring 8 according to the first embodiment. As illustrated in FIG. 4, the tolerance ring 8 includes a base 80 and a plurality of projections 81. The base 80 is formed of a strip-like stainless steel plate substantially wound around into a shape. The projections 81 are provided on the base 80. The projections 81 protrude in the radial direction on the outer peripheral side of the base 80 (in the direction orthogonal to a main surface of the base 80). In this specification, in the base 80, the direction that is orthogonal to the radial direction and the winding direction of the base 80 (specifically, the direction orthogonal to the longitudinal direction and a wall thickness of the strip-like stainless steel) will be referred to as a width direction.

The projections 81 are provided in two rows along the winding direction of the tolerance ring 8. After the tolerance ring 8 is inserted into the opening in the carriage 5, the pivot shaft 7 is press-fitted in the inside of the tolerance ring 8. Here, the projections 81 come into pressure contact with the inner wall surface of the joint portion 52 of the carriage 5 and fix the carriage 5 and the pivot shaft 7 to each other. The projection 81 may protrude in the direction toward the inner peripheral side along the radial direction.

Preferably, each row formed by the projections 81 is disposed on the edge end side from a viewpoint of stability of fixing between the carriage 5 and the pivot shaft 7 or positions of balls in the bearing of the pivot shaft 7 when the hard disk device 1 is assembled. In addition, although two rows are provided along the winding direction of the tolerance ring 8 in the present embodiment, one row or three or more rows may be provided.

The tolerance ring 8 has a substantially triangular shape in the winding direction. Specifically, the tolerance ring 8 includes small radius-of-curvature portions 82 and 83. The small radius-of-curvature portions 82 and 83 are disposed at respective positions that divide the length of the base 80 in the longitudinal direction into three equally divided parts. The small radius-of-curvature portions 82 and 83 each form part of the base 80 and are each disposed between projections 81 that are adjacent to each other in the winding direction. The small radius-of-curvature portions 82 and 83 each have a radius of curvature smaller than other portions. The base 80 has ends 84 and 85 in the winding direction brought close to each other to form a substantially triangular shape (a triangle with rounded corners, resembling a circle).

Figure 6:
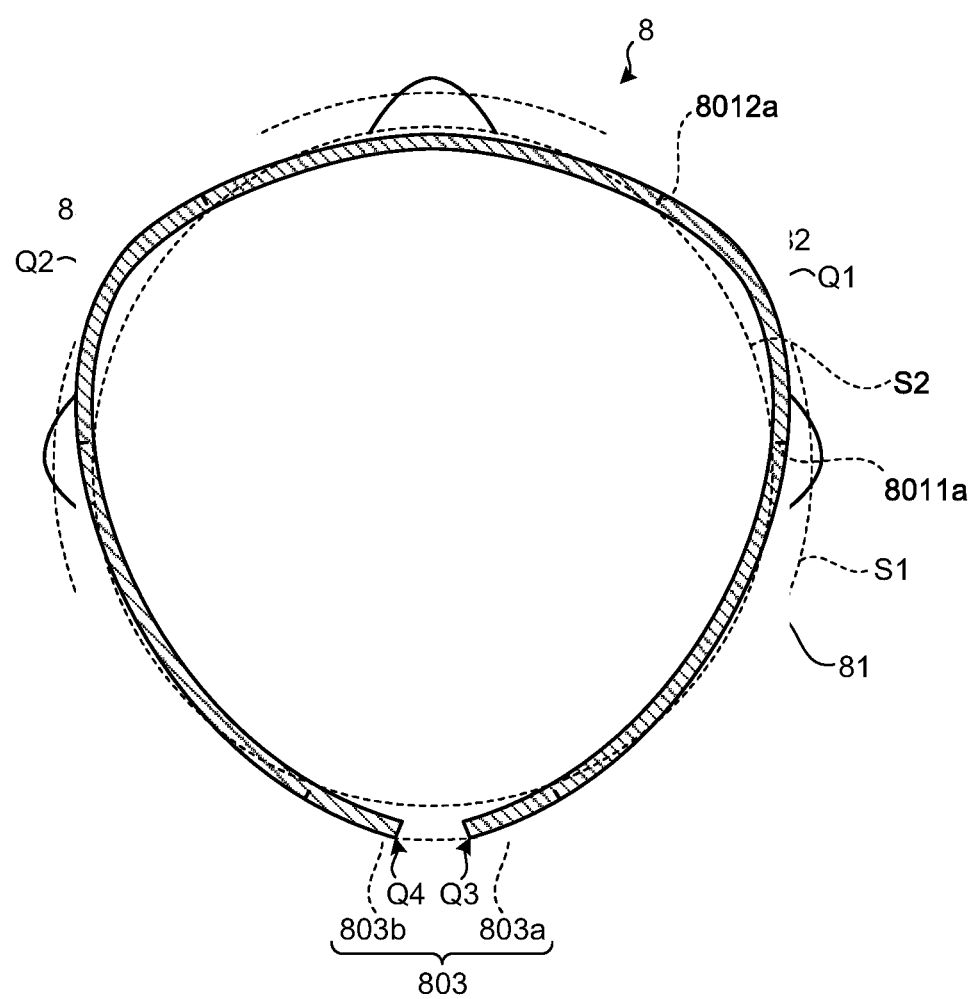
FIG. 6 is a sectional view illustrating the configuration of the tolerance ring according to the first embodiment of the present invention, illustrating a base necked down with both ends brought close to each other.

FIG. 6 is a sectional view illustrating the configuration of the tolerance ring 8 according to the first embodiment, illustrating the base necked down with both ends (ends 84 and 85) brought close to each other. The sectional view of FIG. 6 represents a section of the base 80 taken along a plane that extends in parallel with the radial direction of the base 80 and that does not pass the projections 81. The sectional view of FIG. 6 illustrates the base 80 that is necked down with both ends in the winding direction brought close to each other relative to the base 80 in its natural state. The natural state as used herein refers to a condition in which no load but gravity is being applied to the tolerance ring 8. In the section of the base 80 illustrated in FIG. 6, a circumscribed circle S1 that circumscribes this section is in contact with contact points Q1, Q2, Q3, and Q4. Specifically, the contact point Q1 is included in a region in which the small radius-of-curvature portion 82 is formed. The contact point Q2 is included in a region in which the small radius-of-curvature portion 83 is formed. The contact point Q3 is included in a region in which the end 84 is formed. The contact point Q4 is included in a region in which the end 85 is formed.

The base 80 includes extended portions 801 to 803 that extend from an edge end portion 86 in the width direction of the base 80 in the width direction. The extended portions 801 to 803 extend in the width direction from respective parts of the edge end portion 86. The respective parts of the edge end portion 86 include portions of contact between the section of the base 80 and the circumscribed circle S1 in the width direction of the base 80 (contact points Q1 to Q4). The extended portion 801 extends from a part of the edge end portion 86 on a first side in the width direction of the base 80 and includes the small radius-of-curvature portion 82 in the width direction. An extended portion 802 extends from a part of the edge end portion 86 on the first side in the width direction of the base 80 and includes the small radius-of-curvature portion 83 in the width direction.

The extended portion 803 includes a first extended portion 803*a* and a second extended portion 803*b*. Specifically, the first extended portion 803*a* extends from a part of the edge end portion 86 of the base 80 including the end 84 in the width direction. The second extended portion 803*b* extends from a part of the edge end portion 86 of the base 80 including the end 85 in the width direction.

In the above-described section of the base 80, and with reference to the small radius-of-curvature portions 82 and 83, a distance between a portion having a minimum radius of curvature and a center N1 of the circumscribed circle S1 (for example, a distance R1 in FIG. 6) is greater than a distance between a portion in the base 80 not including the small radius-of-curvature portions 82 and 83 in the width direction (for example, a distance R2 in FIG. 6) and is a maximum among other distances between the base 80 and the center N1.

It should here be noted that the diameter of the circumscribed circle of the base 80 of the tolerance ring 8 or the diameter of the circumscribed circle including the projections 81 is greater than the diameter of the joint portion 52 of the carriage 5 under a condition in which no external load is being applied. The tolerance ring 8, when housed in the joint portion 52, deforms into a shape that maintains the above-described relation of the distances R1 and R2.

Figure 7:
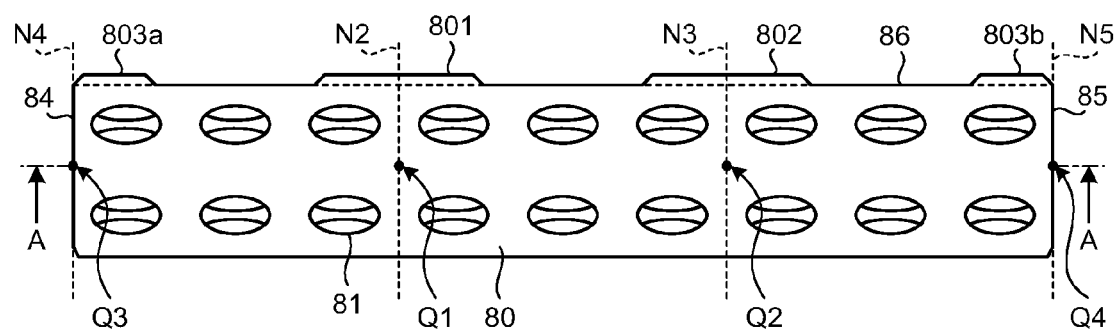
FIG. 7 is an exploded view schematically illustrating the configuration of the tolerance ring according to the first embodiment of the present invention.
Figure 8:
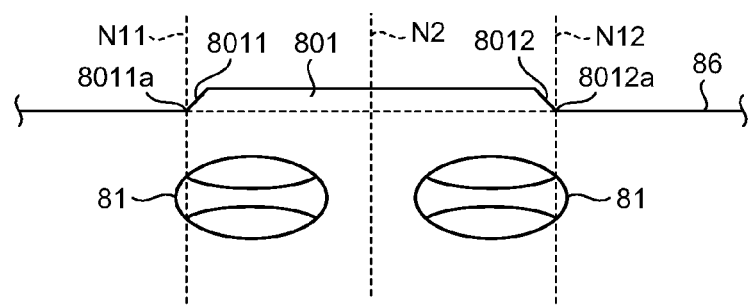
FIG. 8 is a schematic view illustrating the configuration of main components of the tolerance ring according to the first embodiment of the present invention.

FIG. 7 is an exploded view schematically illustrating the configuration of the tolerance ring 8 according to the first embodiment of the present invention, in which the tolerance ring 8 (base 80) is unwound in the longitudinal direction. FIG. 8 is a schematic view illustrating the configuration of main components of the tolerance ring 8 according to the first embodiment of the present invention. The extended portions 801 and 802, the first extended portion 803*a*, and the second extended portion 803*b* each have a shape (tapered) having both ends in the winding direction of the base 80 closer to each other toward distal ends. For example, the extended portion 801 illustrated in FIG. 8 has inclined portions 8011 and 8012 in which both ends in the winding direction are inclined to be closer to each other toward the distal ends in the extended direction. The extended portion 802, the first extended portion 803*a*, and the second extended portion 803*b* are each formed to have similar inclined portions. The extended portions 801 and 802, the first extended portion 803*a*, and the second extended portion 803*b* each have a substantially trapezoidal shape in a plan view in the exploded view of the base 80, extending from the edge end portion 86 in the width direction of the base 80.

In the first embodiment, the extended portions 801 and 802 are disposed such that their central portions are disposed at respective positions that divide the length of the base 80 in the longitudinal direction into three equally divided parts. When the plane upon which FIG. 6 is taken corresponds to line A-A in FIG. 7, the extended portion 801 extends from a region that passes through the contact point Q1 and that includes a straight line N2 extending in parallel with the width direction. The extended portion 802 extends from a region that passes through the contact point Q2 and that includes a straight line N3 extending in parallel with the width direction. The extended portions 801 and 802 are symmetrical with respect to the respective straight lines N2 and N3 as the axes of symmetry.

In each of the extended portions 801 and 802, two straight lines that pass through respective proximal ends joining the base 80, out of both ends described above, (for example, the inclined portions 8011 and 8012 in FIG. 8) and that extend in parallel with the width direction of the base 80 cross the projections 81 that are adjacent to each other in the winding direction. More specifically, a straight line N11 that passes through a first proximal end 8011*a* of the extended portion 801 crosses a first projection 81 of the two projections 81. A straight line N12 that passes through a second proximal end 8012*a* of the extended portion 801 crosses a second projection 81 of the two projections 81. The extended portion 802 is similarly configured.

The first extended portion 803*a* extends from a region that passes through the contact point Q3 and that includes a straight line N4 extending in parallel with the width direction. The second extended portion 803*b* extends from a region that passes through the contact point Q4 and that includes a straight line N5 extending in parallel with the width direction. In the first extended portion 803*a* and the second extended portion 803*b*, the abovementioned straight lines cross the projections 81 at proximal ends on the side different from the sides adjacent to the ends 84 and 85. Additionally, in the first extended portion 803*a* and the second extended portion 803*b*, the sides adjacent to the ends 84 and 85 of the base 80 in the winding direction may extend in parallel with end faces of the base 80 without any inclined portions (not tapered).

Additionally, in the tolerance ring 8 according to the first embodiment, the proximal ends of the extended portions 801 to 803 (for example, proximal ends 8011*a* and 8012*a*) are preferably disposed on an identical circle when the tolerance ring 8 is housed in the joint portion 52 (for example, the necked down state illustrated in FIG. 6). To state the foregoing differently, each of the proximal ends of the extended portions 801 to 803 is in contact with a circle (for example, a circle S2 in FIG. 6) when the tolerance ring 8 is housed in the joint portion 52. To cause the extended portions 801 to 803 to be in contact with the pivot shaft 7, the extended portions 801 to 803 are preferably formed such that, when the tolerance ring 8 is housed in the joint portion 52, a circle inscribed in the extended portions 801 to 803, for example, a circle corresponding to the circle S2 illustrated in FIG. 6 has a diameter smaller than the diameter of the pivot shaft 7.

Additionally, the tolerance ring 8 (the base 80) preferably has a length in the winding direction (longitudinal direction) that is equal to or slightly smaller than the circumferential length of an opening in the joint portion 52. The projections 81 may protrude radially inwardly.

As illustrated in FIG. 7, in the first embodiment, the projections 81 are arrayed in two rows along the longitudinal direction and nine projections are disposed in each row. The number of projections 81 arrayed in one row is a multiple of 3. Disposing the projections 81 in number corresponding to multiples of 3 achieves the following. Specifically, under the condition in which the ends 84 and 85 are brought close to each other, the projections 81 contact the wall surface of the joint portion 52 in abutment therewith symmetrically at angles of 120° with respect to the wall surface. The contact substantially evens out load applied to the wall surface of the joint portion 52, so that bearing operating efficiency can be maintained with high accuracy.

Figure 9:
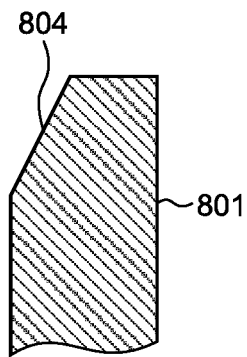
FIG. 9 is a sectional view illustrating a configuration of main components of the tolerance ring according to the first embodiment of the present invention.

FIG. 9 is a sectional view illustrating a configuration of main components of the tolerance ring 8. The extended portion 801 has a tapered portion 804 at a distal end in the extended direction (width direction of the base 80). The tapered portion 804 is formed on the side opposite to the side on which the projections 81 protrude, specifically, on the inner peripheral side of the base 80. The tapered portion 804 has an inclined surface that is inclined such that it has a smaller thickness toward the distal end. The tapered portion 804 has an end in the extended direction on the inner peripheral side chamfered. When viewed along the extended direction, the surface on the side opposite to the surface on the side from which the projections 81 protrude is closer to the surface on the side from which the projections 81 protrude toward the distal end. The extended portions 802 and 803 each have a similar tapered portion 804.

When the pivot shaft 7 has an outer edge at a distal end chamfered, the tapered portion 804 is preferably formed such that an angle formed between the base 80 in the width direction and a main surface of the tapered portion 804 corresponds to the chamfer. Additionally, the tapered portion 804 may even be provided along the edge end portion 86 of the base 80.

After the tolerance ring 8 has been inserted in the joint portion 52 in the carriage 5, the pivot shaft 7 is press-fitted in the inside of the tolerance ring 8. The press-fitting of the pivot shaft 7 causes the projections 81 to be pressed against the wall surface of the joint portion 52 in the carriage 5, so that the carriage 5 and the pivot shaft 7 are fixed to each other.

Figure 10:
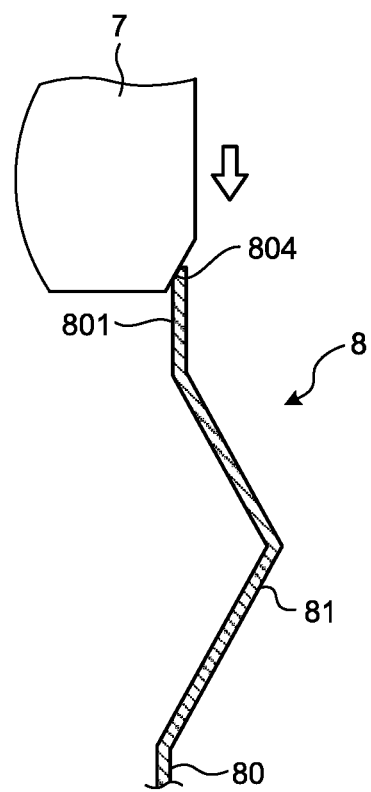
FIG. 10 is a diagram illustrating insertion of a pivot shaft into the tolerance ring in the hard disk device according to the first embodiment of the present invention.

FIG. 10 is a diagram illustrating the insertion of the pivot shaft 7 into the tolerance ring 8 in the hard disk device 1 according to the present embodiment. To press-fit the pivot shaft 7 into the tolerance ring 8, a distal end of the pivot shaft 7 in an insertion direction (direction indicated by the arrow in FIG. 10) first contacts the tapered portion 804 disposed at the proximal end of the tolerance ring 8. This first step enables the insertion without the proximal end of the tolerance ring 8 and the distal end of the pivot shaft 7 scratching each other upon contact therebetween. Thus, while the pivot shaft 7 is being press-fitted in the tolerance ring 8, contamination due to damage on the proximal end of the tolerance ring 8 and/or the wall surface of the pivot shaft 7 can be prevented from occurring.

When the pivot shaft 7 is being inserted in the tolerance ring 8, the distal end first abuts on the extended portions 801, 802, and 803. As the pivot shaft 7 is further inserted into the tolerance ring 8, the pivot shaft 7 enlarges the diameter of the base 80, while slidably contacting the extended portions 801, 802, and 803. The pivot shaft 7 is press-fitted into the base 80 through the diameter enlarging operation. In this process, the pivot shaft 7 abuts on the extended portions 801, 802, and 803 of the tolerance ring 8 to enlarge the diameter of the base 80 (diameter of the opening formed by the edge end portion 86). Even when an inscribed circle of the base 80 has a diameter smaller than the diameter of the distal end of the pivot shaft 7 before the press-fitting of the pivot shaft 7, therefore, the distal end surface of the pivot shaft 7 is not likely to abut on to bind on the edge end portion 86 of the base 80 or the binding is not likely to damage the side surface of the pivot shaft 7 or the end face of the base 80.

The tolerance ring 8 can be fabricated, for example, by a method as follows. This fabrication method uses a transfer press in which predetermined press operations are successively performed on a base material extending like a strip. First, a contouring process is performed by a press on a base material extending like a flat plate. The outer shape (outer edge) of the tolerance ring 8 is thereby shaped to form a substrate having the outer shape of the tolerance ring 8 including the extended portions 801 to 803. Next, a process of forming the inclined portion 804 and a process of forming the projections 81 are performed on the formed substrate. A curving process is then performed on the substrate having the projections 81 formed thereon. In this process, the substrate is curved such that the positions that divide the substrate into three equally divided parts have a small radius of curvature to thereby form the small radius-of-curvature portions 82 and 83.

It should be noted that the ends 84 and 85 in the winding direction preferably have a radius of curvature equal to the radius of curvature of the joint portion 52 of the carriage 5. When the tolerance ring 8 is housed in the joint portion 52 of the carriage 5 and the pivot shaft 7 is press-fitted into the tolerance ring 8, the foregoing arrangement allows the tolerance ring 8 to have a circular shape including the ends 84 and 85 along the winding direction, having a radius of curvature substantially equal to the radius of curvature of the joint portion 52. Thus, when the tolerance ring 8 is inserted in the joint portion 52 of the carriage 5 or the pivot shaft 7 is press-fitted in the tolerance ring 8, the ends 84 and 85 of the tolerance ring 8 can prevent the wall surface of the joint portion 52 from being damaged. As a result, occurrence of contamination by the tolerance ring 8 can be prevented.

In accordance with the first embodiment described above, the base 80 formed of a substantially wound around strip-like member includes the extended portions 801 to 803. The extended portions 801 to 803 extend in the width direction from parts of the edge end portion 86 in the width direction of the base 80. The parts that constitute the edge end portion 86 in the width direction of the base 80 contact the circumscribed circle that circumscribes a section of the base 80 that is necked down with both ends brought close to each other. The parts of the edge end portion 86 include the portions of contact with the circumscribed circle (the small radius-ofcurvature portions 82 and 83 and the ends 84 and 85). The foregoing configuration allows insertion performance to be improved during the insertion of the pivot shaft 7 into the tolerance ring 8. Thus, the tolerance ring 8 can be prevented from, for example, being damaged and contamination that would otherwise occur during the insertion of the pivot shaft 7 can be prevented.

As described above, the tolerance ring 8 according to the first embodiment enables easy insertion of the pivot shaft 7 into the inside of the tolerance ring 8. Additionally, the tolerance ring 8 according to the first embodiment enables reliable fixing between the carriage 5 and the pivot shaft 7 through the pressure contact achieved by the projections 81 with respect to the wall surface of the joint portion 52.

It should be noted that, in the first embodiment described above, the tapered portion 804 has been described to be formed through chamfering. The tapered portion 804 may nonetheless be formed through pressworking. The tapered portion 804, when formed through the pressworking, can increase the density of the base 80 at the end to achieve greater hardness of the end. This approach results in the following. Specifically, when the pivot shaft 7 is inserted, the end (tapered portion 804) can be prevented from being deformed due to load applied from the pivot shaft 7 to the base 80.

In the first embodiment described above, the tapered portion 804 has been described to form an inclined surface such that the extended portion has a smaller thickness toward the distal end. The extended portion is, however, required only to have a thickness at the distal end thinner than a thickness at the central portion thereof. Thus, the extended portion may, for example, have an arcuate surface on the inner peripheral side.

In the first embodiment described above, if the pivot shaft 7 has a specific side fixed to be inserted into the tolerance ring 8, the extended portions 801 to 803 are provided on the end of the specific insertion side.

Additionally, in the first embodiment described above, the extended portions 801 and 802 each have been described to extend over two projections 81. The extended portion may nonetheless extend over three or more projections 81 when a central portion thereof is disposed between two projections 81 adjacent to each other in the winding direction. In addition, the extended portion has been described such that the straight line N2 or N3 is disposed at the center of the extended portion. The straight lines N2 and N3 may still be each disposed at a position not the center and are required to be included in the respective regions that form the extended portions.

First Modification of First Embodiment

Figure 11:
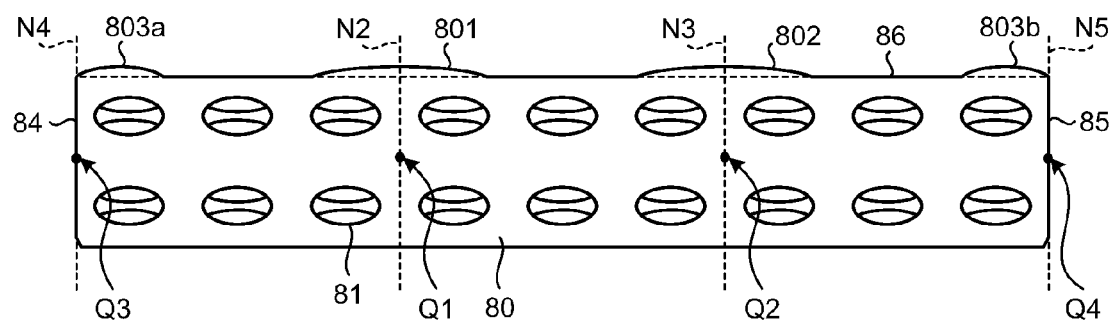
FIG. 11 is an exploded view schematically illustrating a configuration of a tolerance ring according to a first modification of the first embodiment of the present invention.

FIG. 11 is an exploded view schematically illustrating a configuration of a tolerance ring 8 according to a first modification of the first embodiment. In the first embodiment described above, the extended portions 801 to 803 each have been described to extend from the end portion in the width direction of the base 80 to form a trapezoid. The extended portions 801 to 803 may each nonetheless be formed to be an arc extending along the longitudinal direction of the base 80, as in the first modification. In addition to having a trapezoidal or arcuate shape, the extended portions 801 to 803 may each be a projection having a sharp tip.

Second Modification of First Embodiment

Figure 12:
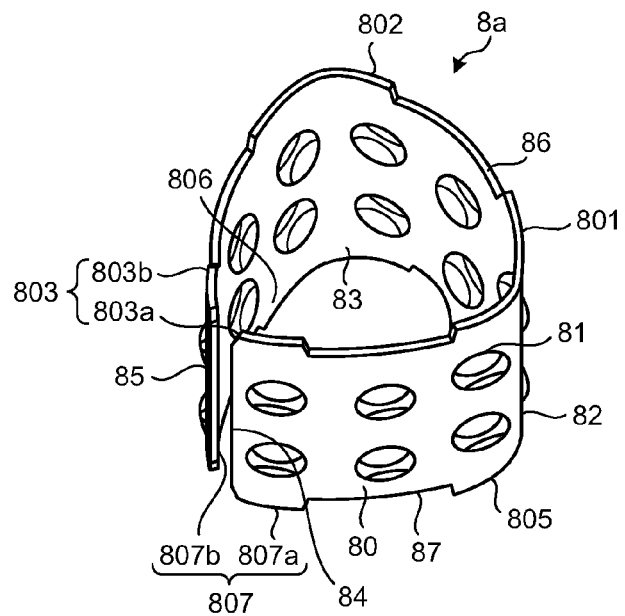
FIG. 12 is a perspective view illustrating a configuration of a tolerance ring according to a second modification of the first embodiment of the present invention.
Figure 13:
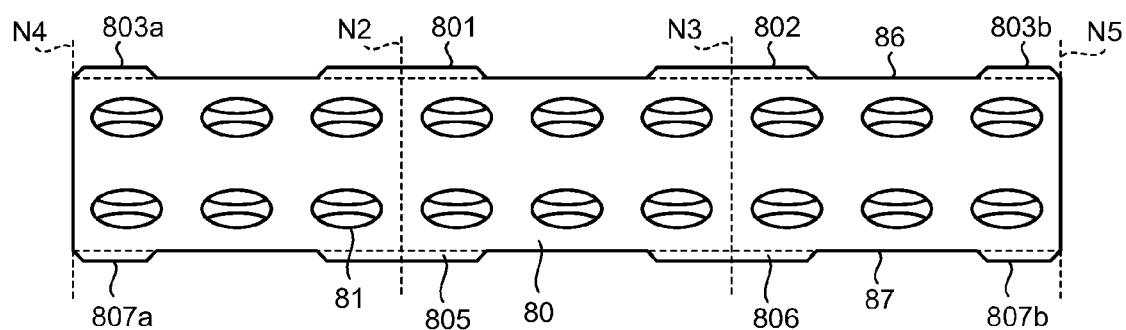
FIG. 13 is an exploded view schematically illustrating the configuration of the tolerance ring according to the second modification of the first embodiment of the present invention.

FIG. 12 is a perspective view illustrating a configuration of a tolerance ring 8a according to a second modification of the first embodiment. FIG. 13 is an exploded view schematically illustrating the configuration of the tolerance ring 8a according to the second modification of the first embodiment. In the first embodiment described above, the extended portions 801 to 803 have been described to be disposed on a first end (edge end portion 86) of the base 80. The extended portions 801 to 803 may still be provided on both ends in the width direction of the base 80 as in the second modification.

The tolerance ring 8a in the second modification includes a base 80 and a plurality of projections 81. The base 80 is formed of a strip-like stainless steel plate substantially wound around into a shape. The projections 81 are provided on the base 80. The base 80 includes extended portions 801 to 803 and 805 to 807. The extended portions 801 to 803 extend in the width direction from the edge end portion 86 of the base 80. The extended portions 805 to 807 extend in the width direction from an edge end portion 87 disposed on a second side in the width direction of the base 80.

As with the extended portions 801 and 802, the extended portions 805 and 806 in the second modification are disposed such that central portions are disposed at respective positions that divide the length of the base 80 in the longitudinal direction into three equally divided parts. The extended portion 805 extends from a region that passes through a contact point Q1 and that includes a straight line N2 extending in parallel with the width direction. The extended portion 806 extends from a region that passes through a contact point Q2 and that includes a straight line N3 extending in parallel with the width direction. The extended portions 805 and 806 are symmetrical with respect to the respective straight lines N2 and N3 as the axes of symmetry.

As with the extended portion 803, the extended portion 807 includes a first extended portion 807a and a second extended portion 807b. Specifically, the first extended portion 807a is disposed on the edge end portion 87 of the base 80 that is an edge end portion including an end 84. The second extended portion 807b is disposed on the edge end portion 87 of the base 80 that is an edge end portion including an end 85. The first extended portion 807a extends from a region that passes through a contact point Q3 and that includes a straight line N4 extending in parallel with the width direction. The second extended portion 807b extends from a region that passes through a contact point Q4 and that includes a straight line N5 extending in parallel with the width direction.

The tolerance ring 8a according to the second modification includes the extended portions disposed on both sides in the width direction of the base 80. This configuration eliminates the need for specifying orientation of the tolerance ring 8a when the tolerance ring 8a is to be disposed in the carriage 5. Even easier mounting can thus be performed.

Second Embodiment

Figure 14:
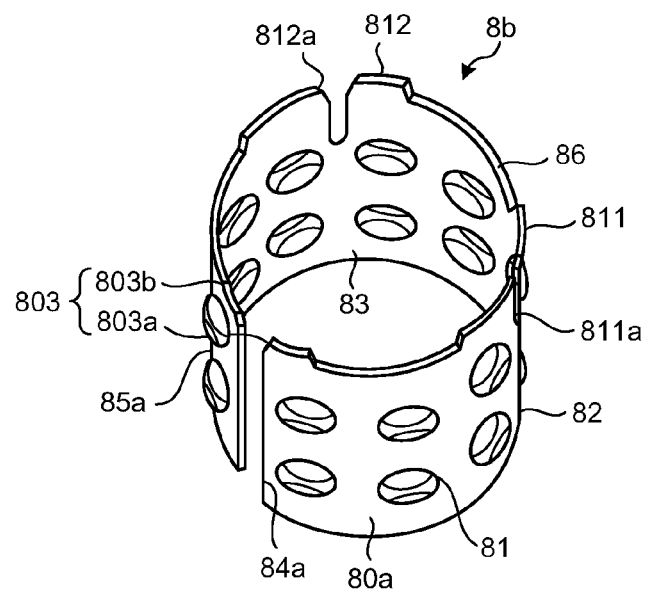
FIG. 14 is a perspective view illustrating a configuration of a tolerance ring according to a second embodiment of the present invention.
Figure 15:
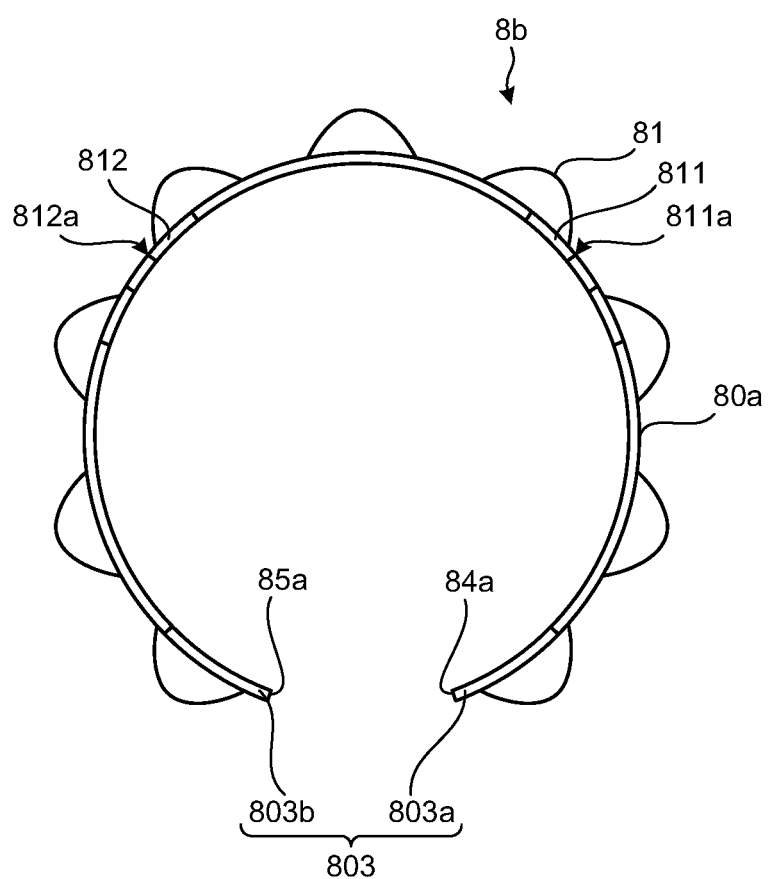
FIG. 15 is a plan view illustrating the configuration of the tolerance ring according to the second embodiment of the present invention.
Figure 16:
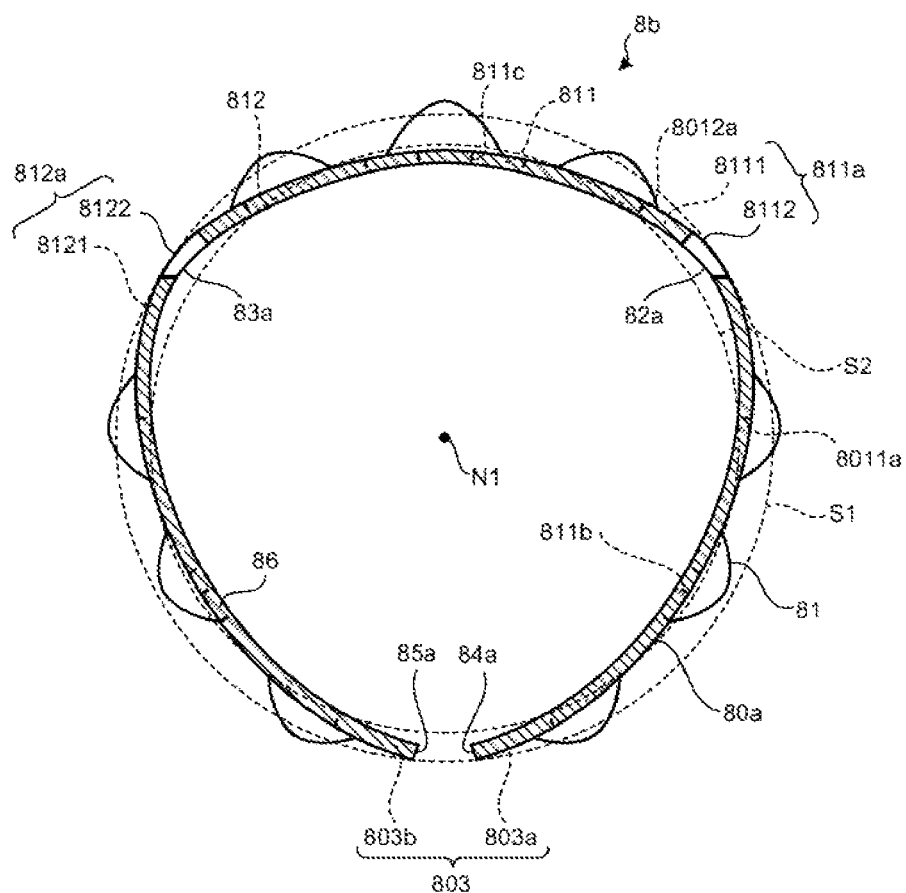
FIG. 16 is a sectional view illustrating the configuration of the tolerance ring according to the second embodiment of the present invention, illustrating a base necked down with both ends brought close to each other.
Figure 17:
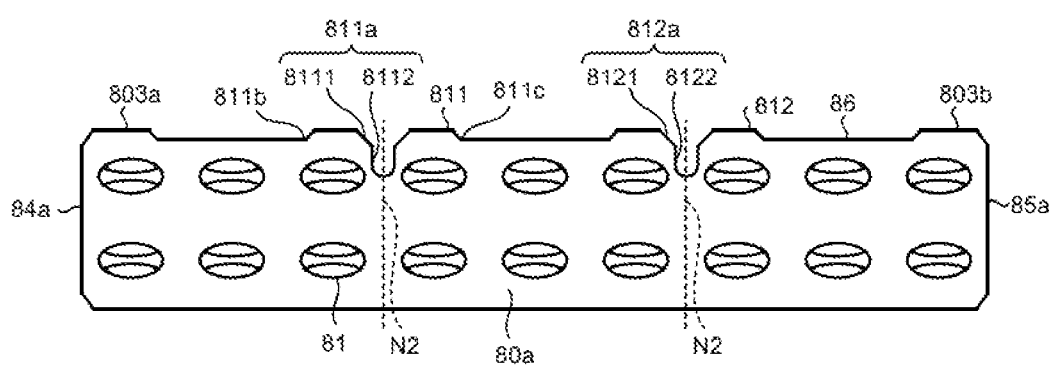
FIG. 17 is an exploded view schematically illustrating the configuration of the tolerance ring according to the second embodiment of the present invention.

The following describes a second embodiment of the present invention with reference to FIGS. 14 to 17. FIG. 14 is a perspective view illustrating a configuration of a tolerance ring 8b according to the second embodiment. FIG. 15 is a plan view illustrating the configuration of the tolerance ring 8b according to the second embodiment. FIG. 16 is a sectional view illustrating the configuration of the tolerance ring 8b according to the second embodiment, illustrating a base necked down with both ends brought close to each other. FIG. 17 is an exploded view schematically illustrating the configuration of the tolerance ring 8b according to the second embodiment. It should be noted that like reference numerals are used to denote like or corresponding elements described above with reference to, for example, FIG. 1. While the base 80 has been described to have a substantially triangular section in the first embodiment described above, the base 80 has a slit (cutout) extending in the width direction of the base 80 in the second embodiment and a base 80a has a substantially circular shape in a plan view.

The tolerance ring 8b according to the second embodiment includes the base 80a and a plurality of projections 81. The base 80 is formed of a strip-like stainless steel plate substantially wound around into a shape. The projections 81 are provided on the base 80a. The base 80a includes the extended portion 803 described above and extended portions 811 and 812 that extend in the width direction from an edge end portion 86. As illustrated in FIG. 15, the base 80a of the tolerance ring 8b has a circular shape in the winding direction (the shape formed by the base 80a excluding the projections 81 in a plan view).

The extended portion 811 has a cutout 811a that is formed by being cut in the width direction of the base 80a from a distal end in the extended direction. The extended portion 812 has a cutout 812a that is formed by being cut in the width direction of the base 80a from the distal end in the extended direction.

The cutout 811a includes a first cutout portion 8111 and a second cutout portion 8112. The first cutout portion 8111 is formed by being cut in the width direction of the base 80a from the distal end in the extended direction and has a cutout width that forms a small taper extending from the distal end to a proximal end. The second cutout portion 8112 is formed by being cut in the width direction of the base 80a from an end of the first cutout portion 8111 and has a uniform cutout width.

The cutout 812a includes a first cutout portion 8121 and a second cutout portion 8122. The first cutout portion 8121 is formed by being cut in the width direction of the base 80a from the distal end in the extended direction and has a cutout width that forms a small taper extending from the distal end to a proximal end. The second cutout portion 8122 is formed by being cut in the width direction of the base 80a from an end of the first cutout portion 8121 and has a uniform cutout width. It should be noted that, in the second embodiment, a boundary between the first cutout portion 8121 and the second cutout portion 8122 is disposed on a plane that passes through an end in the width direction of the base 80a.

The second cutout portion 8112 and the second cutout portion 8122 each have a proximal end (an end different from an end joining the corresponding first cutout portion) extending into a region between the projections 81 that are adjacent to each other in the winding direction.

In a sectional view (a plan view in the width direction of the base 80a) in which the base 80a is necked down with both ends brought close to each other as illustrated in FIG. 16, a circumscribed circle S1 of the base 80a circumscribes the base 80a including the extended portions 803, 811, and 812 in the width direction. To state the foregoing differently, the circumscribed circle S1 is in contact with small radius-of-curvature portions 82a and 83a and ends 84a and 85a. It should here be noted that the small radius-of-curvature portions 82a and 83a represent portions that are formed through deformation occurring due to reduction in stiffness of the base 80a by the cutouts 811a and 812a so as to have a radius of curvature smaller than the radiuses of curvature of other portions.

The extended portions 811 and 812 extend from respective edge end portions including the small radius-of-curvature portions 82a and 83a, respectively, in the width direction of the edge end portion 86. As with the extended portions 801 and 802, the extended portions 811 and 812 are disposed such that central portions are disposed at respective positions that divide the length of the base 80a in the longitudinal direction into three equally divided parts. To state the foregoing differently, the extended portions 811 and 812 are symmetrical with respect to the respective straight lines N2 and N3 described above as the axes of symmetry. The cutouts 811a and 812a are symmetrical with respect to the abovementioned respective straight lines N2 and N3 as the axes of symmetry.

Additionally, with the tolerance ring 8b, under a condition in which the tolerance ring 8b is housed in a joint portion 52, the extended portions 803, 811, and 812 have proximal ends (for example, proximal ends 811b and 811c) disposed on an identical circle. Preferably, the extended portions 803, 811, and 812 are formed such that, under a condition in which the tolerance ring 8b is housed in the joint portion 52 and elastically deformed, a circle inscribed in the extended portions 803, 811, and 812, for example, a circle corresponding to a circle S2 illustrated in FIG. 16 has a diameter smaller than the diameter of a pivot shaft 7.

In accordance with the second embodiment described above, the base 80a formed of a substantially wound around strip-like member includes the extended portions 803, 811, and 812. The extended portions 803, 811, and 812 extend in the width direction from parts of the edge end portion 86 in the width direction of the base 80a. The parts that constitute the edge end portion 86 in the width direction of the base 80a contact the circumscribed circle that circumscribes a section of the base 80a that is necked down with both ends brought close to each other. The parts of the edge end portion 86 include the portions of contact with the circumscribed circle (the small radius-of-curvature portions 82a and 83a and the ends 84a and 85a). The foregoing configuration allows insertion performance to be improved during the insertion of the pivot shaft 7 into the tolerance ring 8b. Thus, the tolerance ring 8b can be prevented from, for example, being damaged and contamination that would otherwise occur during the insertion of the pivot shaft 7 can be prevented.

Additionally, in accordance with the second embodiment described above, the tolerance ring 8b has the cutouts 811a and 812a. This configuration results in strength in regions in which the cutouts 811a and 812a are formed to be reduced as compared with strength of other portions. As a result, when the tolerance ring 8b is necked down (housed in a carriage 5), the regions in which the cutouts 811a and 812a are formed tend to be deformed as compared with other portions. Thus, the regions in which the cutouts 811a and 812a are formed constitute contact points (small radius-of-curvature portions 82a and 83a) in contact with the circumscribed circle. Thus, providing the extended portions 811 and 812 at portions that include the regions in the width direction allows insertion performance of the pivot shaft 7 to be improved.

In the conventional tolerance ring, inserting the pivot shaft into the inside of the tolerance ring that has been fitted in the carriage by insertion enlarges the diameter as the insertion progresses. In this process, the diameter of the tolerance ring on the side from which the pivot shaft is inserted is enlarged and, as a reaction, the diameter on the other side is reduced. The change in the diameters on both sides of the tolerance ring causes the end on the side opposite to the insertion side to be raised. When the pivot shaft is further inserted to complete the insertion procedure, the axis of the carriage is tilted through rotation with respect to the central axis of the pivot shaft. This condition affects assembly accuracy of a drive mechanism.

In the second embodiment described above, the extended portions 811 and 812 of the tolerance ring 8b have the cutouts 811a and 812a formed therein. This arrangement achieves the following effect. Specifically, when the pivot shaft 7 is inserted into the inside of the tolerance ring 8b and even when the diameter of the tolerance ring 8b on the side from which the pivot shaft 7 is inserted is enlarged, the diameter on the other side is prevented from being reduced as a reaction. The arrangement thus prevents the end on the side opposite to the insertion side from being raised following the diameter enlargement. The carriage 5 can thus be prevented from rotating with respect to the pivot shaft 7. As a result, the drive mechanism can be accurately assembled in the hard disk device 1. It should be noted that, to achieve the above-described effect, preferably the cutouts 811a and 812a are provided on the end opposite to the pivot shaft 7 insertion side.

Modification of Second Embodiment

Figure 18:
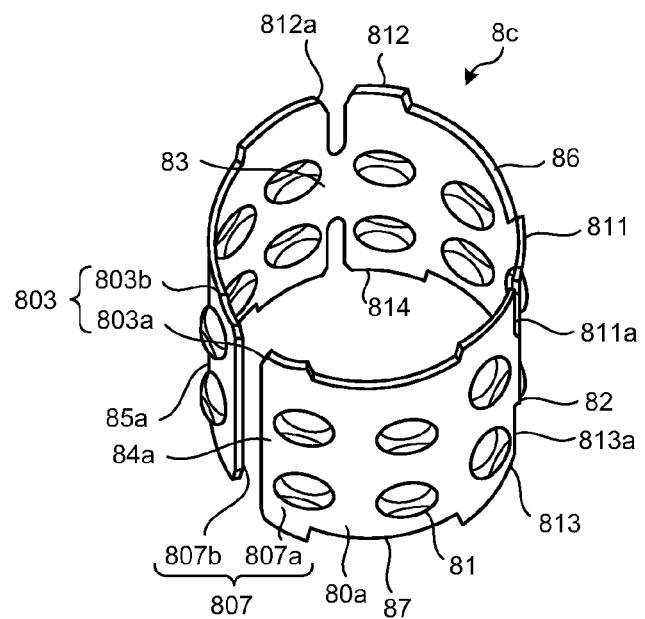
FIG. 18 is a perspective view illustrating a configuration of a tolerance ring according to a modification of the second embodiment of the present invention.
Figure 19:
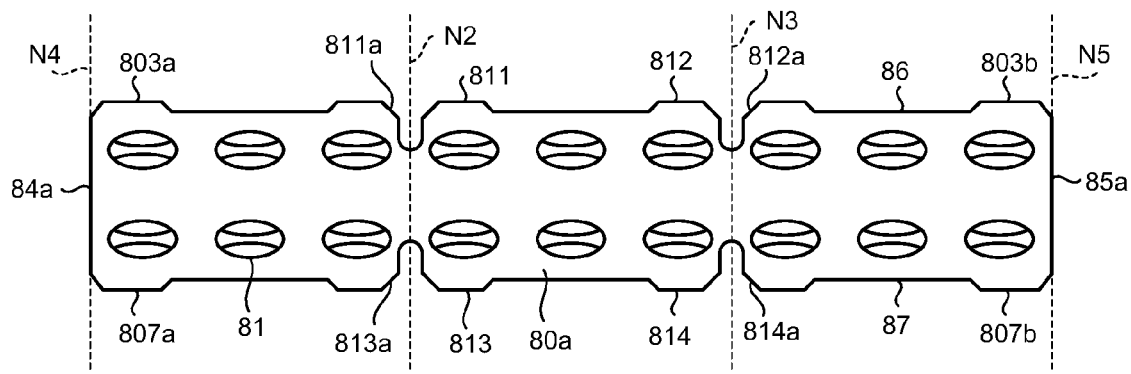
FIG. 19 is an exploded view schematically illustrating the configuration of the tolerance ring according to the modification of the second embodiment of the present invention.

FIG. 18 is a perspective view illustrating a configuration of a tolerance ring 8c according to a modification of the second embodiment. FIG. 19 is an exploded view schematically illustrating the configuration of the tolerance ring 8c according to the modification of the second embodiment. The tolerance ring 8c according to the modification includes a base 80a formed of a strip-like stainless steel plate substantially wound around into a shape and a plurality of projections 81 provided on the base 80a.

The base 80a includes extended portions 803, 811, 812 extending in the width direction and provided on an edge end portion 86 and extended portions 807, 813, 814 extending in the width direction and provided on an edge end portion 87.

In the modification, the extended portions 813 and 814 are disposed, as with the extended portions 811 and 812 described above, such that central portions are disposed at respective positions that divide the length of the base 80a in the longitudinal direction into three equally divided parts. The extended portion 813 extends from a region that passes through a contact point Q1 and that includes a straight line N2 extending in parallel with the width direction. The extended portion 814 extends from a region that passes through a contact point Q2 and that includes a straight line N3 extending in parallel with the width direction. The extended portions 813 and 814 are symmetrical with respect to the respective straight lines N2 and N3 as the axes of symmetry.

Additionally, the extended portions 813 and 814 have cutouts 813a and 814a that have shapes similar to those of the cutouts 811a and 812a described above.

The tolerance ring 8c according to the modification achieves an effect similar to the effect achieved by the second embodiment described above. In addition, the tolerance ring 8c in the modification includes the extended portions along both ends in the width direction of the base 80a. This arrangement eliminates the need for specifying orientation of the tolerance ring 8c when the tolerance ring 8c is to be disposed in the carriage 5. Even easier mounting can thus be performed.

In the second embodiment and the modification described above, the base has been described to take a circular shape in the natural state. The base may nonetheless include the small radius-of-curvature portions in the natural state as in the first embodiment. In this case, the portions having the cutouts are the small radius-of-curvature portions.

Third Embodiment

Figure 20:
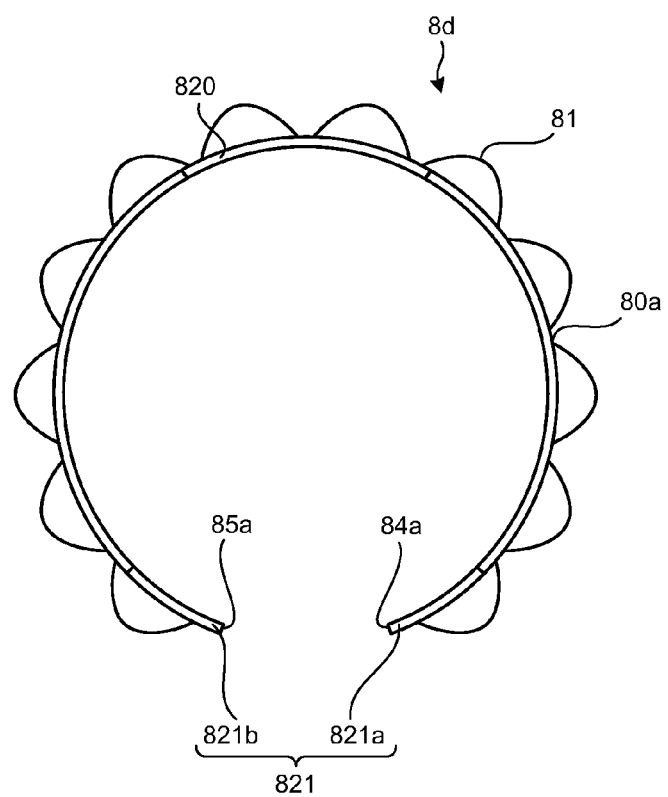
FIG. 20 is a plan view illustrating a configuration of a tolerance ring according to a third embodiment of the present invention.
Figure 21:
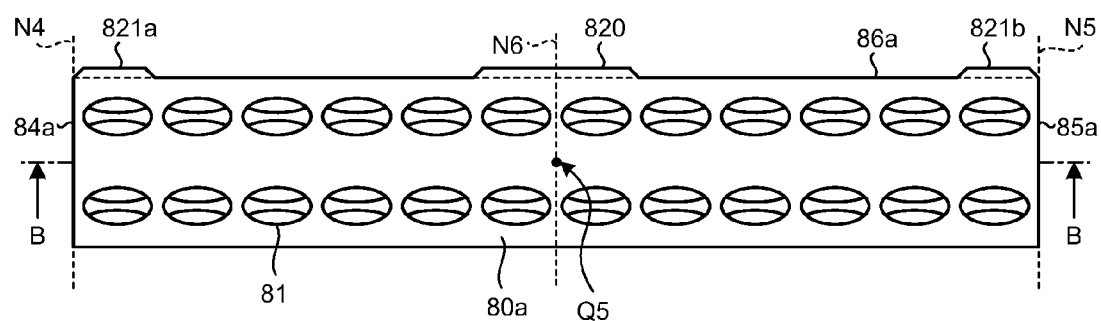
FIG. 21 is an exploded view schematically illustrating the configuration of the tolerance ring according to the third embodiment of the present invention.
Figure 22:
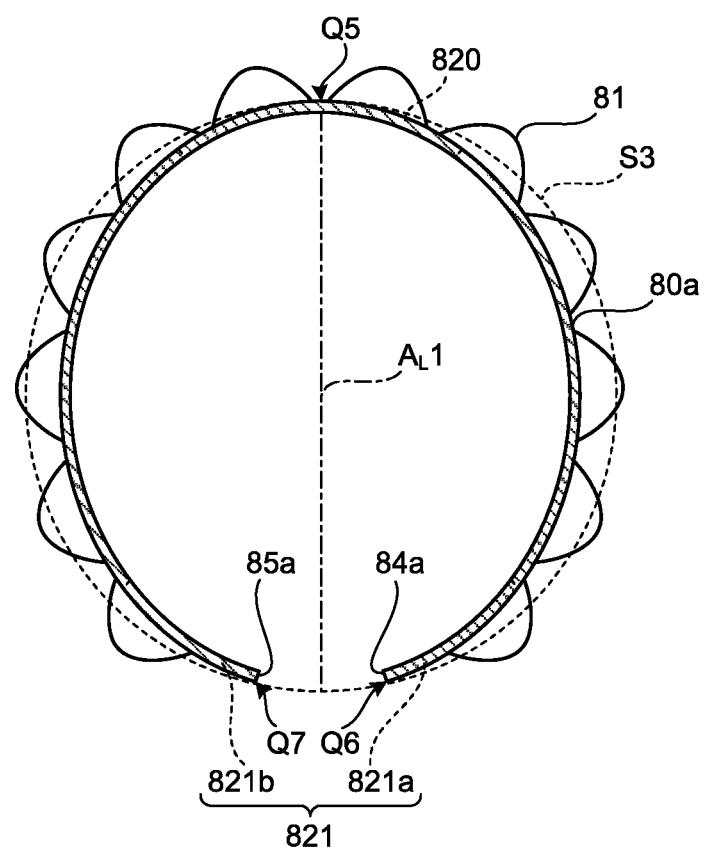
FIG. 22 is a sectional view illustrating the configuration of the tolerance ring according to the third embodiment of the present invention, illustrating a base necked down with both ends brought close to each other.

The following describes a third embodiment of the present invention with reference to FIGS. 20 to 22. FIG. 20 is a plan view illustrating a configuration of a tolerance ring 8d according to the third embodiment. FIG. 21 is an exploded view schematically illustrating the configuration of the tolerance ring 8d according to the third embodiment, in which the tolerance ring 8d (base 80a) is unwound in the longitudinal direction. FIG. 22 is a sectional view illustrating the configuration of the tolerance ring 8d according to the third embodiment, illustrating the base necked down with both ends (ends 84a and 85a) brought close to each other. It should be noted that like reference numerals are used to denote like or corresponding elements described above with reference to, for example, FIG. 1. While the base 80 has been described to have a substantially triangular section in the first embodiment described above, the base 80a in the third embodiment has a substantially circular section. It should further be noted that the tolerance ring 8d according to the third embodiment will be described to include 12 projections 81 arrayed in the winding direction. Thus, in the third embodiment described above, no projections 81 are disposed at a position opposed to a space (gap) formed by the ends 84a and 85a.

The tolerance ring 8d according to the third embodiment includes the base 80a formed of a strip-like stainless steel plate substantially wound around into a shape and a plurality of projections 81 provided on the base 80a.

The sectional view of FIG. 22 represents a section of the base 80a taken along a plane that extends in parallel with the radial direction of the base 80a and that does not pass the projections 81. The sectional view of FIG. 22 illustrates the base 80a that is necked down with both ends in the winding direction brought close to each other relative to the base 80a in its natural state. In the section of the base 80a illustrated in FIG. 22, an outer edge has a substantially elliptic shape and a major axis $A_L1$ extends to pass between both ends (ends 84a and 85a) in the winding direction of the base 80a. In the section of the base 80a, a circumscribed circle S3 that circumscribes the section is in contact with a contact point Q5 that crosses the major axis $A_L1$, a contact point Q6 included in a region that forms the end 84a, and a contact point Q7 included in a region that forms the end 85a.

The base 80a includes extended portions 820 and 821 that extend in the width direction from an edge end portion 86a in the width direction of the base 80a. The extended portion 820 extends from part of the edge end portion 86a on a first side in the width direction of the base 80a. The part of the edge end portion 86a includes the contact point Q5 in the width direction. The extended portion 821 includes a first extended portion 821a and a second extended portion 821b. The first extended portion 821a extends from part of the edge end portion 86a of the base 80a. The part of the edge end portion 86a includes the contact point Q6 in the width direction. The second extended portion 821b extends from part of the edge end portion 86a of the base 80a. The part of the edge end portion 86a includes the contact point Q7 in the width direction.

As with the extended portion 801 described above, the extended portion 820 has a shape (tapered) having both ends in the winding direction of the base 80a closer to each other toward distal ends. For example, the extended portion 820 illustrated in FIG. 21 has inclined portions in which both ends in the winding direction are inclined to be closer to each other toward the distal ends in the extended direction. The first extended portion 821a and the second extended portion 821b each have a similar inclined portion. The extended portion 820, the first extended portion 821a, and the second extended portion 821b each have a substantially trapezoidal shape in a plan view in the exploded view of the base 80a, extending from the edge end portion 86a in the width direction of the base 80a. The first extended portion 821a and the second extended portion 821b have configurations similar to the configurations of the first extended portion 803a and the second extended portion 803b described above.

In the third embodiment, the extended portion 820 is disposed such that a central portion thereof is disposed at the center in the longitudinal direction of the base 80a. When the plane upon which FIG. 22 is taken corresponds to line B-B in FIG. 21, the extended portion 820 extends from a region that passes through the contact point Q5 and that includes a straight line N6 extending in parallel with the width direction. The extended portion 820 is symmetrical with respect to the straight line N6 as the axis of symmetry.

It should here be noted that the diameter of the circumscribed circle of the base 80a of the tolerance ring 8d or the diameter of the circumscribed circle including the projections 81 is greater than the diameter of a joint portion 52 of a carriage 5 under a condition in which no external load is being applied. The tolerance ring 8d, when housed in the joint portion 52, deforms into a shape that maintains the relative relation in the section of FIG. 22. Specifically, the shape (section) of the base 80a housed in the joint portion 52 is such that the portions including the extended portions 820 and 821 in the width direction contact the circumscribed circle of the section.

After the tolerance ring 8d has been inserted in the joint portion 52 in the carriage 5, a pivot shaft 7 is press-fitted in the inside of the tolerance ring 8d. The press-fitting of the pivot shaft 7 causes the projections 81 to be pressed against the wall surface of the joint portion 52 in the carriage 5, so that the carriage 5 and the pivot shaft 7 are fixed to each other.

In accordance with the third embodiment described above, in the base 80a formed of the strip-like member substantially wound around into a shape, the extended portions 820 and 821 extend in the width direction from parts of the edge end portion 86a in the width direction of the base 80a. The parts that constitute the edge end portion 86a in the width direction of the base 80a contact the circumscribed circle that circumscribes a section of the base 80a that is necked down with both ends brought close to each other. The parts of the edge end portion 86a include the portions of contact with the circumscribed circle. The foregoing configuration allows insertion performance to be improved during the insertion of the pivot shaft 7 into the tolerance ring 8d. Thus, the tolerance ring 8d can be prevented from, for example, being damaged and contamination that would otherwise occur during the insertion of the pivot shaft 7 can be prevented.

Fourth Embodiment

Figure 23:
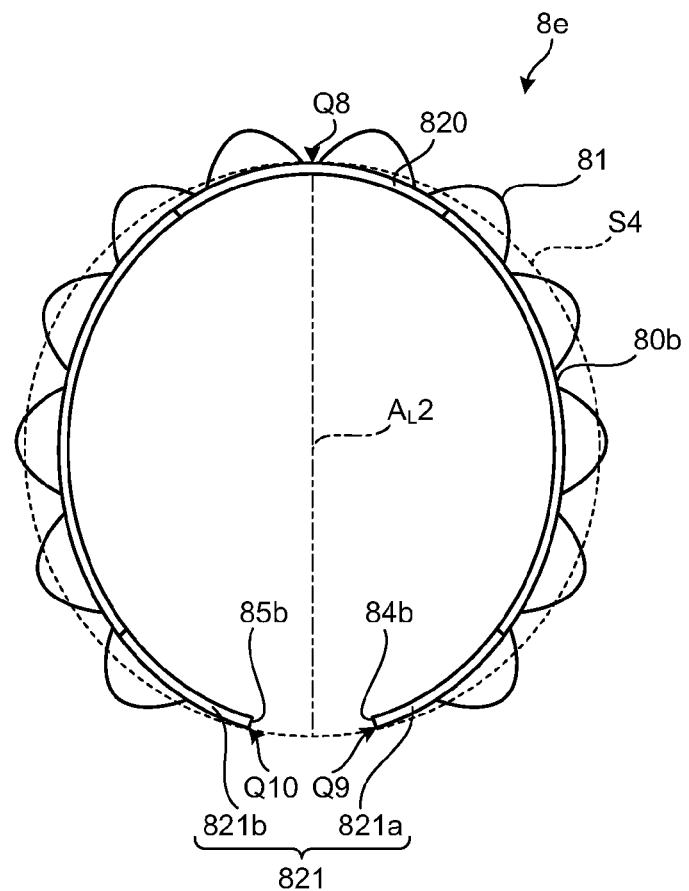
FIG. 23 is a plan view illustrating a configuration of a tolerance ring according to a fourth embodiment of the present invention.

The following describes a fourth embodiment of the present invention with reference to FIG. 23. FIG. 23 is a plan view illustrating a configuration of a tolerance ring 8e according to the fourth embodiment. It should be noted that like reference numerals are used to denote like or corresponding elements described above with reference to, for example, FIG. 1. While the base 80a has been described to have a circular section (in a plan view excluding the projections 81) in the third embodiment described above, a base 80a excluding projections 81 in a plan view in the fourth embodiment has a substantially elliptic section. It should further be noted that, in the fourth embodiment, the base 80a housed in a joint portion 52 will be described to have a shape (section of the base 80a necked down with both ends brought close to each other) that is deformed to maintain a relative relation in the plan view of the base 80a (excluding the projections 81) in the natural state illustrated in FIG. 22. The tolerance ring 8e in the fourth embodiment will be described to include 12 projections 81 arrayed in the winding direction.

The tolerance ring 8e according to the fourth embodiment includes the base 80b formed of a strip-like stainless steel plate substantially wound around into a shape and a plurality of projections 81 provided on the base 80b. In the tolerance ring 8e, an outer edge of the base 80b has a substantially elliptic shape and a major axis $A_L2$ extends to pass between both ends (ends 84b and 85b) in the winding direction of the base 80b. A circumscribed circle S4 that circumscribes the shape formed by the outer edge of the base 80b excluding the projections 81 (the section of the base 80b taken along a plane that extends in parallel with the radial direction of the base 80b and that does not pass the projections 81) is in contact with a contact point Q8 that crosses the major axis $A_L2$, a contact point Q9 included in a region that forms the end 84b, and a contact point Q10 included in a region that forms the end 85b. The base 80b includes extended portions 820 and 821 that extend in the width direction. Specifically, the extended portion 820 extends from part of an edge end portion in the width direction of the base 80b. The part of the edge end portion includes the contact point Q8 in the width direction. The extended portion 821 extends from part of the edge end portion in the width direction of the base 80b. The part of the edge end portion includes the contact points Q9 and Q10 in the width direction.

The section of the base 80b necked down with the ends 84b and 85b brought close to each other maintains a relative relation with the base 80b in its natural state. Thus, even when the base 80b is necked down, the circumscribed circle S4 that circumscribes the base 80b is in contact with the base 80b including the extended portions 820 and 821, respectively, in the width direction. To state the foregoing differently, a circle similar to the circumscribed circle S4 is in contact with a portion that crosses the major axis $A_L2$ in the section of the base 80b necked down with the ends 84b and 85b brought close to each other (the portion having the smallest radius of curvature) and with the ends 84b and 85b. The extended portions 820 and 821 extend from the edge end portions including these contact points in the width direction.

In accordance with the fourth embodiment described above, in the base 80b formed of the strip-like member substantially wound around into a shape, the extended portions 820 and 821 extend in the width direction from parts of the edge end portion in the width direction of the base 80b. The parts that constitute the edge end portion in the width direction of the base 80b contact the circumscribed circle that circumscribes a section of the base 80b that is necked down with both ends brought close to each other. The parts of the edge end portion include the portions of contact with the circumscribed circle. The foregoing configuration allows insertion performance to be improved during the insertion of the pivot shaft 7 into the tolerance ring 8e. Thus, the tolerance ring 8e can be prevented from, for example, being damaged and contamination that would otherwise occur during the insertion of the pivot shaft 7 can be prevented.

Modification of Fourth Embodiment

Figure 24:
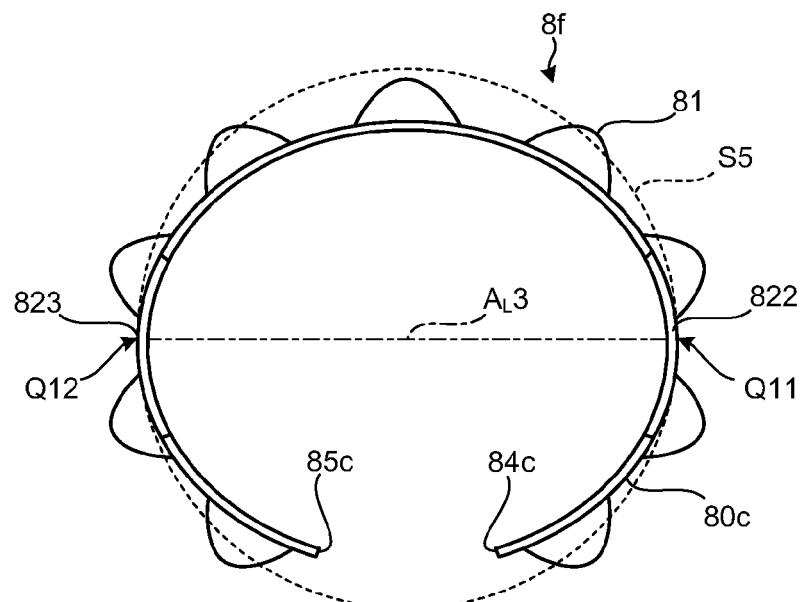
FIG. 24 is a plan view illustrating a configuration of a tolerance ring according to a modification of the fourth embodiment of the present invention.

The following describes a modification of the fourth embodiment of the present invention with reference to FIG. 24. FIG. 24 is a plan view illustrating a configuration of a tolerance ring 8f according to the modification of the fourth embodiment. It should be noted that like reference numerals are used to denote like or corresponding elements described above with reference to, for example, FIG. 1. While the base 80b has been described to have an elliptic section (in a plan view excluding the projections 81) and the major axis $A_L2$ extends to pass between the ends 84b and 85b in the fourth embodiment described above, in this modification, a base 80c has an elliptic section (in a plan view excluding projections 81) and, for example, a major axis $A_L3$ of the base 80c extends substantially orthogonally to the major axis $A_L2$ of the base 80b in the fourth embodiment described above. It should further be noted that this modification will also be described such that, as in the fourth embodiment described above, the shape of the base 80c housed in a joint portion 52 (the section of the base 80c necked down with both ends brought close to each other) deforms into a shape that maintains a relative relation in a plan view (excluding the projections 81) of the base 80c in its natural state illustrated in FIG. 24.

The tolerance ring 8f according to the this modification includes the base 80c formed of a strip-like stainless steel plate substantially wound around into a shape and a plurality of projections 81 provided on the base 80c. In the tolerance ring 8f, the shape of the base 80c in the winding direction is an ellipse that has the major axis $A_L3$ extending substantially in parallel with a straight line that extends to pass between both ends in the winding direction (ends 84c and 85c). A circumscribed circle S5 that circumscribes the shape formed by the outer edge of the base 80c excluding the projections 81 (the section of the base 80c taken along a plane that extends in parallel with the radial direction of the base 80c and that does not pass the projections 81) is in contact with contact points Q11 and Q12 that each cross the major axis $A_L3$. The base 80c includes extended portions 822 and 823 that extend in the width direction. Specifically, the extended portion 822 extends from part of an edge end portion in the width direction of the base 80c. The part of the edge end portion includes the contact point Q11 in the width direction. The extended portion 823 extends from part of the edge end portion in the width direction of the base 80c. The part of the edge end portion includes the contact point Q12 in the width direction. The extended portions 822 and 823 have shapes similar to the shape of the extended portion 801 described above.

The section of the base 80c necked down with the ends 84c and 85c brought close to each other maintains a relative relation with the base 80c in its natural state. Thus, even when the base 80c is necked down, the circumscribed circle S5 that circumscribes the base 80c is in contact with the base 80c including the extended portions 822 and 823, respectively, in the width direction. To state the foregoing differently, a circle similar to the circumscribed circle S5 is in contact with portions that cross the major axis $A_L3$ in the section of the base 80c necked down with the ends 84c and 85c brought close to each other (the portions having the smallest radius of curvature). The extended portions 822 and 823 extend from the edge end portions including these contact points in the width direction.

In accordance with the modification described above, in the base 80c formed of the strip-like member substantially wound around into a shape, the extended portions 822 and 823 extend in the width direction from parts of the edge end portion in the width direction of the base 80c. The parts that constitute the edge end portion in the width direction of the base 80c contact the circumscribed circle that circumscribes a section of the base 80c that is necked down with both ends brought close to each other. The parts of the edge end portion include the portions of contact with the circumscribed circle. The foregoing configuration allows insertion performance to be improved during the insertion of a pivot shaft 7 into the tolerance ring 8f. Thus, the tolerance ring 8f can be prevented from, for example, being damaged and contamination that would otherwise occur during the insertion of the pivot shaft 7 can be prevented.

Fifth Embodiment

Figure 25:
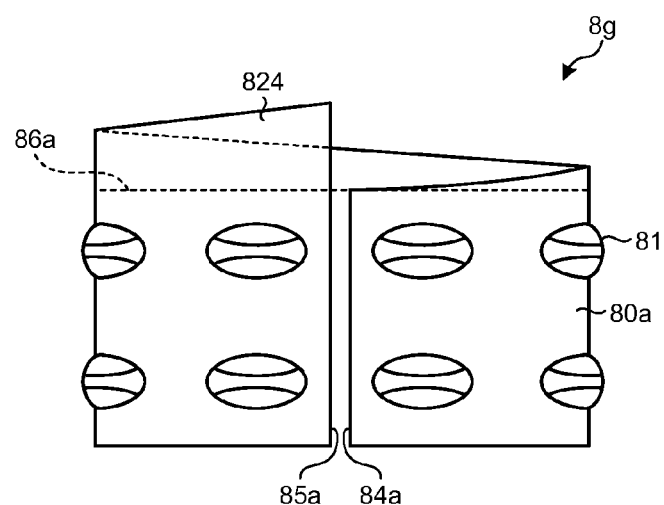
FIG. 25 is a perspective view illustrating a configuration of a tolerance ring according to a fifth embodiment of the present invention.
Figure 26:
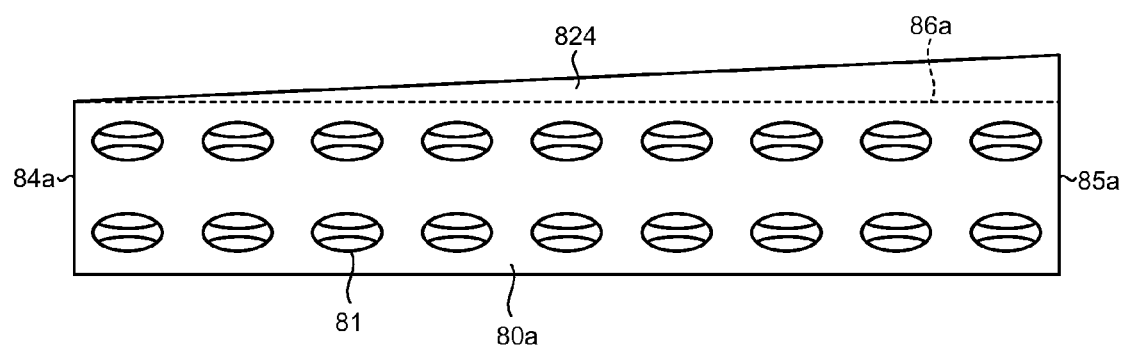
FIG. 26 is an exploded view schematically illustrating the configuration of the tolerance ring according to the fifth embodiment of the present invention.

The following describes a fifth embodiment of the present invention with reference to FIGS. 25 and 26. FIG. 25 is a perspective view illustrating a configuration of a tolerance ring 8g according to the fifth embodiment. FIG. 26 is an exploded view schematically illustrating the configuration of the tolerance ring 8g according to the fifth embodiment. It should be noted that like reference numerals are used to denote like or corresponding elements described above with reference to, for example, FIG. 1. In the third embodiment described above, the extended portions 820 and 821 have been described to extend intermittently from the edge end portion 86a of the base 80a in the width direction of the base 80a. The tolerance ring 8g according to the fifth embodiment includes an extended portion 824 that extends from an edge end portion 86a of a base 80a continuously along the winding direction.

The extended portion 824 extends from the edge end portion 86a of the base 80a continuously along the winding direction. Specifically, the extended portion 824 has an extended length that increases continuously with an increasing distance from a first end (an end 84a in FIGS. 25 and 26) toward a second end (an end 85a in FIGS. 25 and 26). The extended portion 824 has a distal end in the extended direction forming a spiral along the winding of the base 80a. This configuration causes a pivot shaft 7 to abut on the extended portion 824 continuously along the winding direction when the pivot shaft 7 is inserted, so that the base 80a can be gradually enlarged in diameter.

In accordance with the fifth embodiment described above, in the base 80a formed of the strip-like member substantially wound around into a shape, the extended portion 824 is formed along the edge end portion 86a in the width direction of the base 80a to extend from the edge end portion 86a of the base 80a continuously along the winding direction. The foregoing configuration allows insertion performance to be improved during the insertion of the pivot shaft 7 into the tolerance ring 8g. Thus, the tolerance ring 8g can be prevented from, for example, being damaged and contamination that would otherwise occur during the insertion of the pivot shaft 7 can be prevented.

Sixth Embodiment

Figure 27:
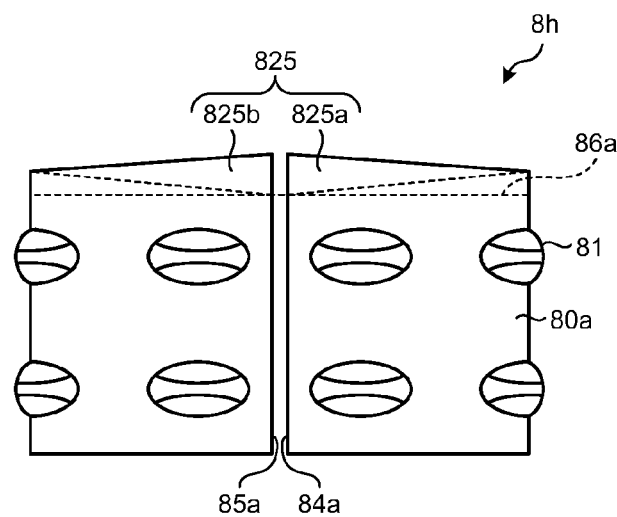
FIG. 27 is a perspective view illustrating a configuration of a tolerance ring according to a sixth embodiment of the present invention.
Figure 28:
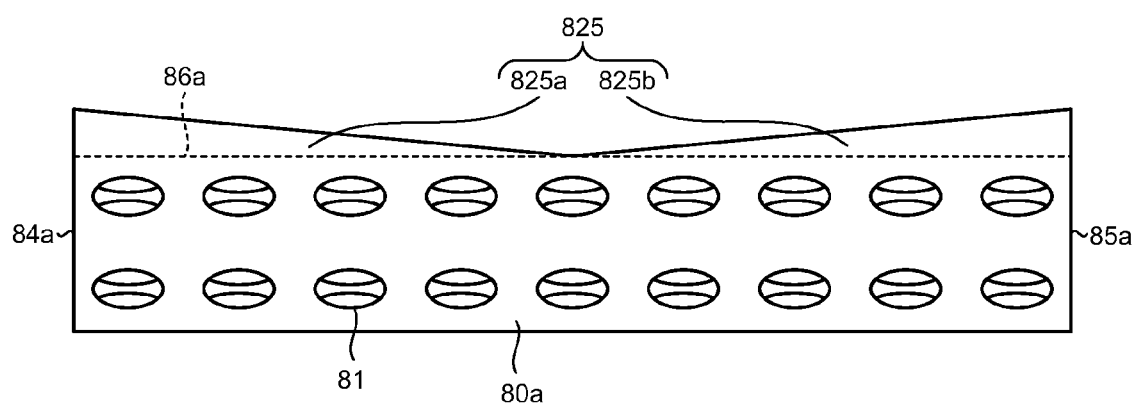
FIG. 28 is an exploded view schematically illustrating the configuration of the tolerance ring according to the sixth embodiment of the present invention.
Figure 29:
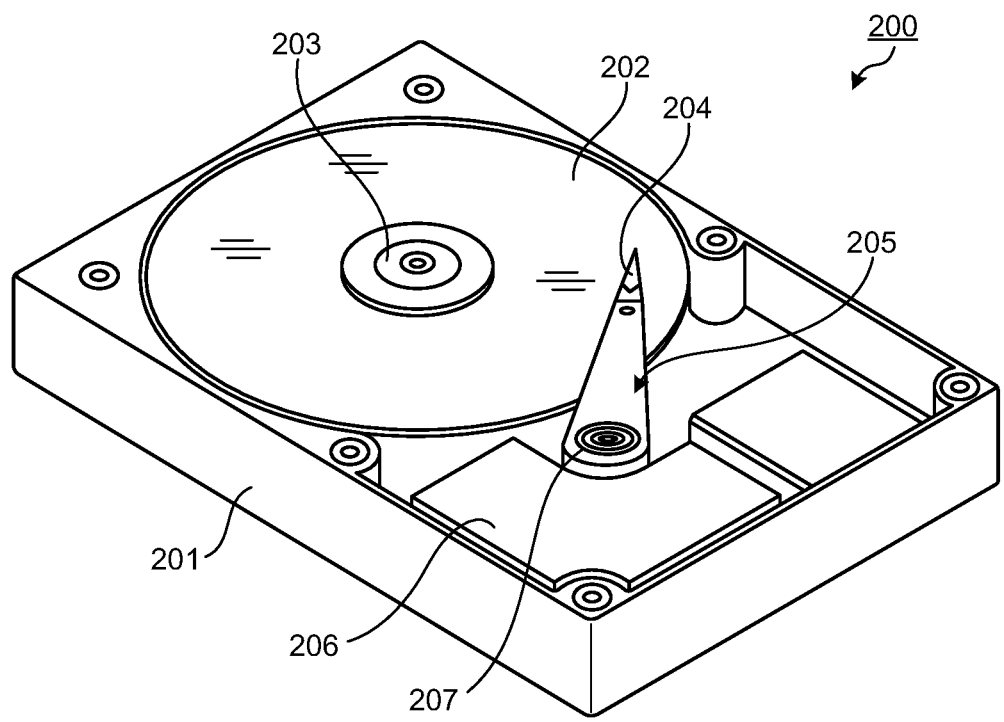
FIG. 29 is a perspective view illustrating a schematic configuration of a conventional hard disk device.
Figure 30:
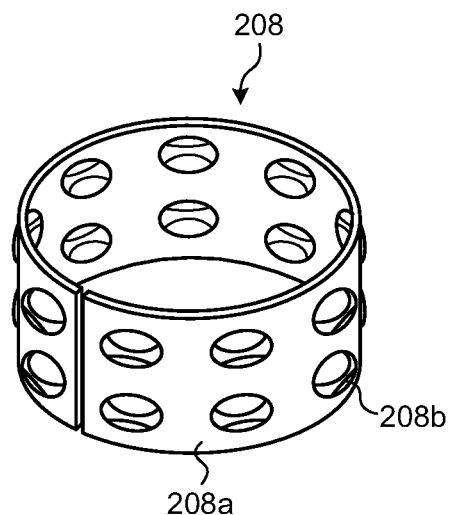
FIG. 30 is a perspective view illustrating a configuration of a tolerance ring in the conventional hard disk device.
Figure 31:
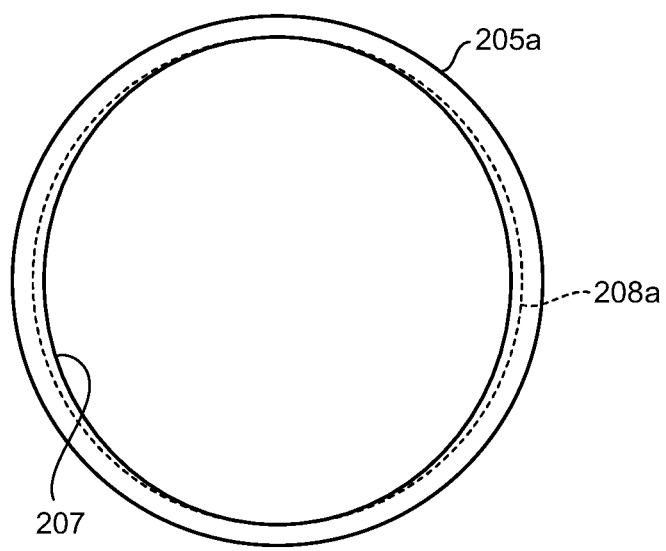
FIG. 31 is a diagram illustrating insertion of a pivot shaft into the tolerance ring in the conventional hard disk device.

The following describes a sixth embodiment of the present invention with reference to FIGS. 27 and 28. FIG. 27 is a perspective view illustrating a configuration of a tolerance ring 8h according to the sixth embodiment. FIG. 28 is an exploded view schematically illustrating the configuration of the tolerance ring 8h according to the sixth embodiment. It should be noted that like reference numerals are used to denote like or corresponding elements described above with reference to, for example, FIG. 1. In the third embodiment described above, the extended portions 820 and 821 have been described to extend intermittently from the edge end portion 86a of the base 80a in the width direction of the base 80a. The tolerance ring 8h according to the sixth embodiment includes an extended portion 825 that extends from a central portion of an edge end portion 86a of a base 80a toward ends 84a and 85a.

The extended portion 825 includes a first extended portion 825a and a second extended portion 825b. Specifically, the first extended portion 825a has an extended length that increases with an increasing distance from the central portion of the edge end portion 86a of the base 80a toward the end 84a. The second extended portion 825b has an extended length that increases with an increasing distance from the central portion of the edge end portion 86a of the base 80a toward the end 85a. The extended portion 825 has the extended length varying along the winding of the base 80a to become a maximum at the ends 84a and 85a. This configuration causes a pivot shaft 7 to abut first on the sides of the ends 84a and 85a of the extended portion 825 (first extended portion 825a and second extended portion 825b) when the pivot shaft 7 is inserted, so that the base 80a can be gradually enlarged in diameter from the sides of the ends 84a and 85a.

In accordance with the sixth embodiment described above, in the base 80a formed of the strip-like member substantially wound around into a shape, the extended portion 825 is formed along the edge end portion 86a in the width direction of the base 80a to extend from the central portion of the edge end portion 86a of the base 80a toward the ends 84a and 85a. The foregoing configuration allows insertion performance to be improved during the insertion of the pivot shaft 7 into the tolerance ring 8h. Thus, the tolerance ring 8h can be prevented from, for example, being damaged and contamination that would otherwise occur during the insertion of the pivot shaft 7 can be prevented.

In the first and the second embodiments described above, the circumscribed circle S1 of the base 80 has been described to circumscribe the small radius-of-curvature portions 82 and 83 and the ends 84 and 85. The circumscribed circle S1 of the base 80 may nonetheless be in contact with only the small radius-of-curvature portions 82 and 83, or either one of the small radius-of-curvature portions 82 and 83, and with the ends 84 and 85. The circumscribed circle of the base 80 is required only to be in contact with at least two or more of the small radius-of-curvature portions 82 and 83 and the ends 84 and 85. It should here be noted that the circumscribed circle S1 may be in contact with either one of the ends 84 and 85.

In the first and the second embodiments described above, the tolerance ring under a condition in which both ends of the base 80 having two radius-of-curvature portions are brought close to each other has been described to have a substantially triangular shape in a plan view. When an insertion side of the pivot shaft 7 with respect to the tolerance ring 8 or 8b is fixed, the insertion side may be rectangular with other portions being substantially circular. In this case, in the curving process described above, the substrate is formed in a stepwise fashion into a substantially circular shape in a plan view; the substrate is then curved such that the end on the insertion side has a radius of curvature smaller than the radius of curvature on the other portions, so that only the end on the insertion side has a rectangular shape.

In the first and the second embodiments described above, the tolerance ring under a condition in which both ends of the base 80 having two radius-of-curvature portions are brought close to each other has been described to have a substantially triangular shape in a plan view. The number of radius-of-curvature portions may nonetheless be three or more to result in the tolerance ring having a quadrilateral or polygonal shape. When the base has three or more radius-of-curvature portions, at least two radius-of-curvature portions are required to be in contact with the circumscribed circle of the base 80.

Additionally, as in the first and the second embodiments described above, the ends 84 and 85 of the base 80 may be brought close to each other, so that an angled corner is formed at the position at which the ends are brought close to each other, or the position at which the ends are brought close to each other forms part of a side. When the position at which the ends are brought close to each other forms part of a side, three or more radius-of-curvature portions are provided and are in contact with the circumscribed circle of the base 80, and the extended portions are provided at edge end portions that include the respective radius-of-curvature portions in the width direction.

Additionally, in the first and the second embodiments described above, the two small radius-of-curvature portions have been described to be disposed at the respective positions that divide the length of the base 80 in the longitudinal direction into three equally divided parts. The radius-of-curvature portions are not, however, required to be disposed at the respective positions that divide the length of the base 80 in the longitudinal direction into equally divided parts. When the pivot shaft 7 has a circular distal end shape, the distance between the extended portions adjacent to each other preferably remains equal (respective proximal ends contact an identical circle) under a condition in which the tolerance ring 8 is housed in the joint portion 52. If the pivot shaft 7 has, for example, an elliptic distal end shape other than a circle, the radius-of-curvature portions and the extended portions are disposed according to the distal end shape.

Additionally, in the first and the second embodiments described above, the extended portion has been described to be symmetrical with respect to a centerline that passes through the center of two projections 81 adjacent to each other in the winding direction and that extends in parallel with the width direction as the axis of symmetry. The centerline is nonetheless required only to pass between the two projections 81 and is not required to pass through the center between the projections 81.

Additionally, in the first and the second embodiments described above, the extended portion includes the first extended portion and the second extended portion disposed at the ends 84 and 85, respectively. The extended portion may nonetheless be disposed at only either one of the ends 84 and 85.

Additionally, the tolerance rings 8d to 8f in the third and the fourth embodiments described above may have cutouts as the cutouts in the second embodiment and the modification thereof. These cutouts are provided in the extended portions.

Additionally, the extended portion is required only to extend from the edge end portion that includes the contact point between the circumscribed circle and the section of the base in the width direction of the base, in addition to the extended portions formed in the tolerance rings 8a to 8f according to the first to the fourth embodiments described above. For example, the position at which the extended portion is to be formed is determined on the basis of any of an end in the winding direction of the base, a portion having a relatively small radius of curvature of the section in the winding direction of the base, and a position at which the cutout is formed, or a plurality of contact points as a combination of these.

INDUSTRIAL APPLICABILITY

As described above, the tolerance rings and the hard disk devices according to the present invention are useful in improving insertion performance of the pivot shaft.

REFERENCE SIGNS LIST 1, 200 Hard disk device
2, 201 Casing body
3, 202 Hard disk
4, 203 Spindle
5, 205 Carriage
6, 206 VCM
7, 207 Pivot shaft
8, 8a, 8b, 8c, 8d, 8e, 8f, 8g, 8h, 208 Tolerance ring
50 Magnetic head unit
50a Suspension
50b, 204 Magnetic head
51 Arm
52 Joint portion
60 Coil
61 Magnet
80, 80a, 80b, 80c, 208a Base
81, 208b Projection
82, 83 Small radius-of-curvature portion
84, 84a, 84b, 84c, 85, 85a, 85b, 85c End
86, 86a, 87 Edge end portion
801 to 803, 805 to 807, 811 to 814, 820 to 825 Extended portion
803a, 807a, 825a First extended portion
803b, 807b, 825b Second extended portion
804 Tapered portion
811a, 812a, 813a, 814a Cutout
811b, 811c, 8011a, 8012a Proximal end
8011, 8012 Inclined portion

The invention claimed is:

1. A tolerance ring comprising:
a base formed of a strip-like member substantially wound around into a shape;
a plurality of projections provided along a winding direction of the base so as to protrude from an outer peripheral surface of the base in a radial direction of the base orthogonal to the outer peripheral surface;
at least one extended portion extending from at least one of edge end portions in a width direction of the base, the width direction extending orthogonally to the winding direction and the radial direction,
wherein the extended portion extends from a region that includes at least one of a plurality of straight lines, the straight lines passing through respective contact points and extend in parallel with the width direction, the contact points being disposed between a section of the base and a circumscribed circle that circumscribes the section, the section being taken along a plane that extends in parallel with the radial direction of the base and that does not pass the projections, and representing the base that is necked down with both ends of the tolerance ring in the winding direction brought close to each other relative to the base in a natural state.

2. The tolerance ring according to claim 1, wherein both ends of the extended portion in the winding direction have inclined portions that are inclined so as to include distal ends in an extended direction becoming gradually closer to each other.

3. The tolerance ring according to claim 1, wherein the contact points include either one of an end in the winding direction of the base, a small radius-of-curvature portion having a radius of curvature relatively smaller than radiuses of curvature of other portions in the winding direction in the section, and a portion at which a cutout in the width direction is formed, or a combination thereof.

4. The tolerance ring according to claim 1, wherein, in the extended portion, at least one of two straight lines crosses the projection, the two straight lines extending in parallel with the width direction and passing through respective proximal ends of both ends of the extended portion in the winding direction which join the base.

5. The tolerance ring according to claim 3, wherein
the small radius-of-curvature portion is provided in plurality, and
the small radius-of-curvature portions are disposed at respective positions that divide a length of the strip-like member in a longitudinal direction into equally divided parts.

6. The tolerance ring according to claim 1, wherein the extended portion has a tapered portion formed on an inner peripheral side on an end in the width direction, the tapered portion having an inclined surface that is inclined such that a wall thickness is thinner toward a distal end.

7. A hard disk device comprising:
a hard disk that serves as a recording medium;
a magnetic head unit configured to record information on the hard disk and to read information from the hard disk;
a carriage configured to support the magnetic head unit and to pivot over a surface of the hard disk;
a tolerance ring including:
a base formed of a strip-like member substantially wound around into a shape;
a plurality of projections provided along a winding direction of the base so as to protrude from an outer peripheral surface of the base in a radial direction of the base orthogonal to the outer peripheral surface;
at least one extended portion extending from at least one of edge end portions in a width direction of the base, the width direction extending orthogonally to the winding direction and the radial direction,
wherein the extended portion extends from a region that includes at least one of a plurality of straight lines, the straight lines passing through respective contact points and extend in parallel with the width direction, the contact points being disposed between a section of the base and a circumscribed circle that circumscribes the section, the section being taken along a plane that extends in parallel with the radial direction of the base and that does not pass the projections, and representing the base that is necked down with both ends of the tolerance ring in the winding direction brought close to each other relative to the base in a natural state; and
a pivot shaft disposed inside the tolerance ring.

* * * * *